United States Patent
Jessen et al.

(10) Patent No.: US 10,155,273 B1
(45) Date of Patent: Dec. 18, 2018

(54) INTERACTIVE OBJECT FABRICATION

(71) Applicant: X Development LLC, Mountain View, CA (US)

(72) Inventors: Johan Jessen, San Francisco, CA (US); Jeff Linnell, Woodside, CA (US); Kendra Byrne, San Francisco, CA (US); Jonathan Proto, San Francisco, CA (US); Brandon Kruysman, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 371 days.

(21) Appl. No.: 15/159,549

(22) Filed: May 19, 2016

(51) Int. Cl.
| | |
|---|---|
| *B23D 59/00* | (2006.01) |
| *G05B 15/02* | (2006.01) |
| *B29C 64/141* | (2017.01) |
| *B29C 64/40* | (2017.01) |
| *B29C 64/386* | (2017.01) |
| *B33Y 10/00* | (2015.01) |
| *B33Y 50/02* | (2015.01) |

(52) U.S. Cl.
CPC .......... *B23D 59/003* (2013.01); *B29C 64/141* (2017.08); *B29C 64/386* (2017.08); *B29C 64/40* (2017.08); *G05B 15/02* (2013.01); *B33Y 10/00* (2014.12); *B33Y 50/02* (2014.12); *Y10S 901/50* (2013.01)

(58) Field of Classification Search
None
See application file for complete search history.

(56) References Cited

U.S. PATENT DOCUMENTS

| | | | | |
|---|---|---|---|---|
| 4,739,487 | A * | 4/1988 | Bonnet | A41H 3/007 |
| | | | | 353/28 |
| 4,941,183 | A * | 7/1990 | Bruder | A41H 3/007 |
| | | | | 382/111 |
| 6,341,996 | B1 | 1/2002 | Brien et al. | |
| 7,241,981 | B2 | 7/2007 | Hofmann | |
| 8,048,606 | B2 | 11/2011 | Barr et al. | |
| 8,118,438 | B2 | 2/2012 | Daniel et al. | |
| 8,838,419 | B2 | 9/2014 | Sullivan et al. | |
| 9,254,640 | B2 | 2/2016 | Miller | |
| 2004/0075882 | A1 * | 4/2004 | Meisburger | G03F 7/70216 |
| | | | | 359/290 |

(Continued)

*Primary Examiner* — Kenneth M Lo
*Assistant Examiner* — Istiaque Ahmed
(74) *Attorney, Agent, or Firm* — Fish & Richardson P.C.

(57) ABSTRACT

Example implementations may relate to interactive object fabrication. In particular, a control system may receive model data defining a 3D shape of a physical object that is fabricable out of a substrate at a work site. The system may then direct a projection system to emit onto the substrate a projection illustrative of the 3D shape defined by the model data. Also, the system may transmit, to a robotic system, fabrication instructions that direct the robotic system to fabricate the physical object in accordance with the model data. subsequently, during fabrication of the physical object, the system may (i) receive progress data indicative of a portion of the physical object that has been fabricated from the substrate, and (ii) direct the projection system to update the projection of the 3D shape to remove a portion of the projection corresponding to the portion of the physical object that has been fabricated.

20 Claims, 24 Drawing Sheets

(56) References Cited

U.S. PATENT DOCUMENTS

| | | | |
|---|---|---|---|
| 2006/0016957 A1* | 1/2006 | Hofmann | B28D 1/043 |
| | | | 250/201.1 |
| 2013/0240227 A1 | 9/2013 | Tauchmann et al. | |
| 2015/0281629 A1 | 10/2015 | Davies | |
| 2016/0031110 A1 | 2/2016 | Middleton et al. | |

* cited by examiner

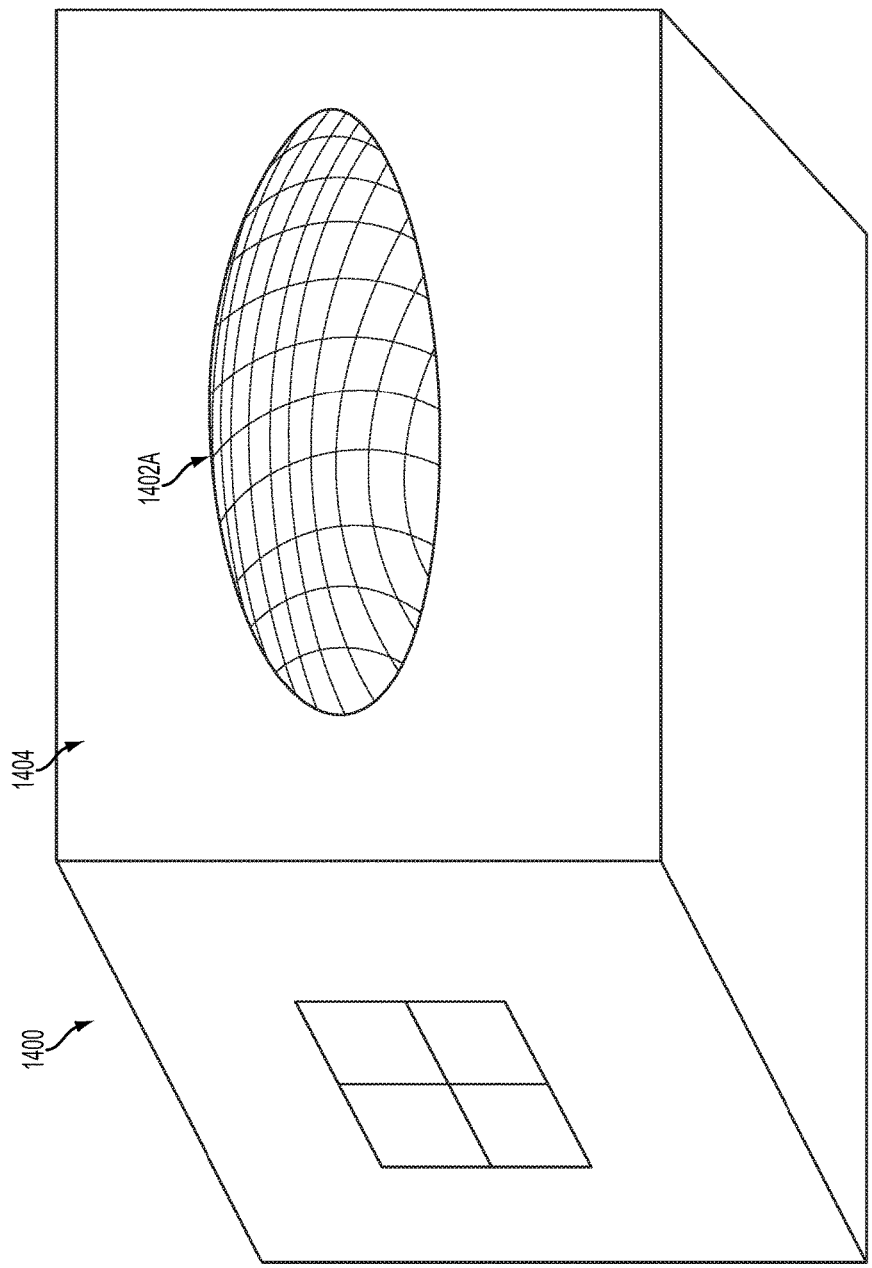

INTERACTIVE OBJECT FABRICATION

BACKGROUND

Robotic systems may be used for applications involving material handling, welding, assembly, dispensing, and fabrication, among others. Over time, the manner in which these robotic systems operate is becoming more intelligent, more efficient, and more intuitive. As robotic systems become increasingly prevalent in numerous aspects of modern life, the need for systems that provide for intuitive object design in the process of robotic system fabrication becomes apparent. Therefore, a demand for such systems has helped open up a field of innovation in projection techniques, sensing techniques, as well as object design and fabrication techniques.

SUMMARY

Example implementations may relate to a control system that is programmatically arranged to direct a projection system to emit projections that may assist users with object design and fabrication, such as when a user seeks to have a robotic system fabricate out of a substrate a certain physical object having a certain 3D shape. In particular, the control system may direct the projection system to emit a projection representative of the 3D shape of the desired object. While that projection is being projected, the control system may also direct a robotic system to fabricate the desired object. As fabrication progresses over time, the control system may update the projection by removing portions of the projection that correspond to portions of the desired object that have already been fabricated, thereby having the updated projection illustrate a remaining portion of the desired object that has not yet been fabricated.

In one aspect, a method is provided. The method involves receiving, by a control system, model data defining a three-dimensional (3D) shape of a physical object that is fabricable out of a substrate at a work site. The method also involves directing, by the control system, a projection system to emit onto the substrate a projection illustrative of the 3D shape defined by the model data. The method additionally involves transmitting, by the control system to a robotic system, fabrication instructions that direct the robotic system to fabricate the physical object out of the substrate in accordance with the model data. The method further involves subsequently, during fabrication of the physical object out of the substrate, the control system: (i) receiving progress data indicative of a portion of the physical object that has been fabricated from the substrate, and (ii) directing the projection system to update the projection of the 3D shape to remove a portion of the projection corresponding to the portion of the physical object that has been fabricated.

In another aspect, a control system is provided. The control system includes one or more processors, a non-transitory computer readable medium, and program instructions stored on the non-transitory computer readable medium and executable by the one or more processors to receive model data defining a three-dimensional (3D) shape of a physical object that is fabricable out of a substrate at a work site. The program instructions are also executable to direct a projection system to emit onto the substrate a projection illustrative of the 3D shape defined by the model data. The program instructions are additionally executable to transmit, to a robotic system, fabrication instructions that direct the robotic system to fabricate the physical object out of the substrate in accordance with the model data. The program instructions are further executable to subsequently, during fabrication of the physical object out of the substrate: (i) receive progress data indicative of a portion of the physical object that has been fabricated from the substrate, and (ii) direct the projection system to update the projection of the 3D shape to remove a portion of the projection corresponding to the portion of the physical object that has been fabricated.

In yet another aspect, a non-transitory computer readable medium is provided. The non-transitory computer readable medium has stored therein instructions executable by one or more processors to cause a control system to perform operations. The operations involve receiving model data defining a three-dimensional (3D) shape of a physical object that is fabricable out of a substrate at a work site. The operations also involve directing a projection system to emit onto the substrate a projection illustrative of the 3D shape defined by the model data. The operations additionally involve transmitting, to a robotic system, fabrication instructions that direct the robotic system to fabricate the physical object out of the substrate in accordance with the model data. The operations further involve subsequently, during fabrication of the physical object out of the substrate: (i) receiving progress data indicative of a portion of the physical object that has been fabricated from the substrate, and (ii) directing the projection system to update the projection of the 3D shape to remove a portion of the projection corresponding to the portion of the physical object that has been fabricated.

In yet another aspect, a system is provided. The system may include means for receiving model data defining a three-dimensional (3D) shape of a physical object that is fabricable out of a substrate at a work site. The system may also include means for directing a projection system to emit onto the substrate a projection illustrative of the 3D shape defined by the model data. The system may additionally include means for transmitting, to a robotic system, fabrication instructions that direct the robotic system to fabricate the physical object out of the substrate in accordance with the model data. The system may further include means for subsequently, during fabrication of the physical object out of the substrate: (i) receiving progress data indicative of a portion of the physical object that has been fabricated from the substrate, and (ii) directing the projection system to update the projection of the 3D shape to remove a portion of the projection corresponding to the portion of the physical object that has been fabricated.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIGS. 14A to 14D illustrate the updating of projections based on fabrication progress and based on input data, according to an example implementation.

DETAILED DESCRIPTION

Figure 1:
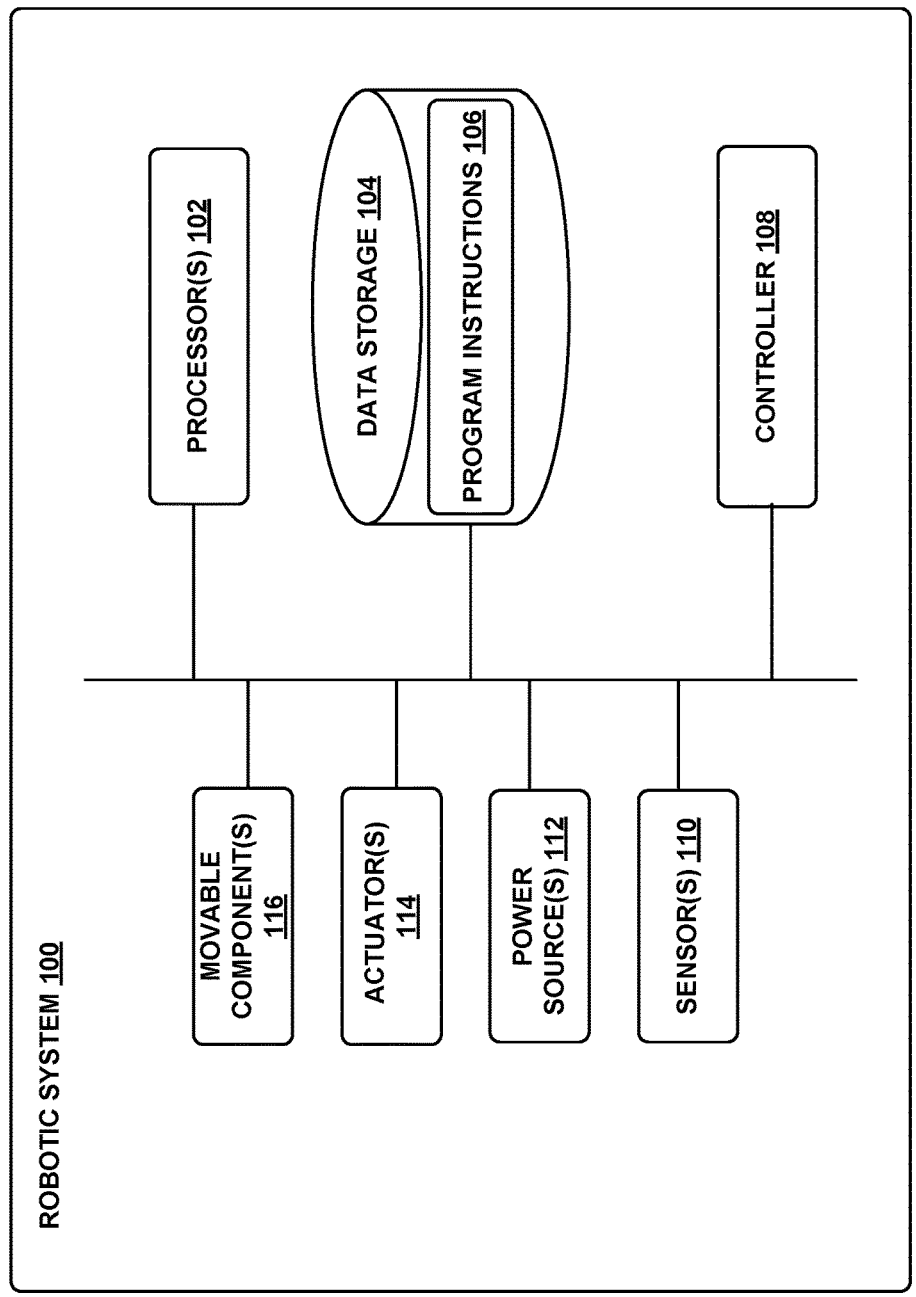
FIG. 1 illustrates a configuration of a robotic system, according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

Example implementations relate to object design and fabrication. In practice, a typical object design and fabrication environment may include a control system that receives from a user (e.g., via a graphical user interface (GUI)) information related to a desired three-dimensional (3D) design/shape of an object to be fabricated out of a substrate. Additionally, the object design and fabrication environment may include a robotic system or any other machinery having tools to fabricate the desired object out of the substrate according to instructions received by the robotic system from the control system. Moreover, this object design and fabrication environment may include some features for making adjustments to the design/shape of the object and/or for tracking fabrication progress. However, such features may sometimes not provide sufficient information that helps visualize the progress and how such adjustments may ultimately impact fabrication of the substrate and/or the resulting appearance of the desired object. As such, disclosed herein are methods and systems to help a user visualize fabrication progress and to interactively make adjustments to a design of an object.

In accordance with the disclosure, a control system may receive model data that provides information related to design and fabrication of an object. This model data may be received via an interface (e.g., GUI) through which a user can provide such information and/or may be determined based on sensor data, among other possibilities. In either case, the model data may define a 3D shape of a physical object (e.g., surfboard) that is to be fabricated out of a substrate (e.g., a piece of polyurethane foam). Also, the model data may provide information about the substrate itself, such as information about location of the substrate within a work site, a material of the substrate, a current physical shape of the substrate, and/or an orientation of the substrate, among others.

Further, the control system may also receive over time sensor data representative of the work site in which the substrate is located, with that sensor data being provided by one or more sensors positioned within or in the vicinity of the work site. For instance, the control system may receive image data, depth data, location data, orientation data, and/or proximity data, among others. Such data may be used by the control system to determine information about the work site, substrate, fabrication progress, other objects located within the work site, and/or users located within the work site, among others.

Yet further, the control system may communicate with a robotic system to instruct the robotic system to fabricate the object in accordance with the model data. To do so, the control system may transmit to the robotic system fabrication instructions that include the model data as well as other forms of information that assist with fabrication, such as indication of a fabrication tool to be used for instance. And during such fabrication, the robotic system may transmit to the control system progress data that is indicative of a portion of the object that has already been fabricated from the substrate, among other possibilities. Alternatively, the control system may determine such fabrication progress based on sensor data.

With these arrangements, the control system may be configured to direct a projection system to emit onto the substrate a projection illustrative of a 3D shape of the desired object to be fabricated and to dynamically update the projection over time according to fabrication progress. In particular, the control system may direct the projection system to update the projection of the 3D shape to remove a portion of the projection corresponding to the portion of the physical object that has been fabricated. In this way, the visual removal of a certain portion of the projection illustrates fabrication progress while the remaining portion of the projection illustrates a portion of the desired physical object that has yet to be fabricated.

In another aspect, the control system may receive input data indicating an adjustment to the 3D shape of the remaining portion that has yet to be fabricated. Once that input data is received, the control system may adjust the model data so that the model data defines the adjusted 3D shape. Additionally, the control system may direct the projection system to emit onto the substrate a projection illustrative of that adjustment to the remaining portion, thereby allowing a user to visualize how the resulting desired object may look once the robotic system ultimately completes fabrication. So in this regard, the control system may also transmit adjusted fabrication instructions to the robotic system, so that the robotic system fabricates the remaining portion according to the adjusted 3D shape.

In an example embodiment, the above-mentioned input data could be received based on movements and/or gestures detected within the work site. In particular, the control system may be configured to use sensor data to detect within the work site a physical item that could be used as an input mechanism for providing instructions to the control system.

For example, the control system may detect a cylindrical wooden block and may determine (e.g., based on mapping data) that the detected cylindrical wooden block could be used as an input mechanism. Moreover, particular instructions may be provided using particular movements of the physical item and/or using particular hand gestures carried out with or relative to the physical item, among other possibilities. As such, the control system may detect a particular movement of the physical item and, based on the detected particular movement, may determine a particular instruction, which may be an instruction to adjust the 3D shape in a particular manner. Moreover, as the control system detects the particular movement, the control system may direct the projection system to dynamically change the projections so as to visually illustrate the adjustments to the 3D shape.

II. Example Design and Fabrication Environments

A. Example Robotic System

Referring now to the figures, FIG. 1 shows an example configuration of a robotic system 100. The robotic system 100 may be a robotic arm, a mobile platform, a mobilized robotic arm, a humanoid robot, a quadrupedal robot, or any type of automated fabrication machinery, among other examples. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion. In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

Figure 2:
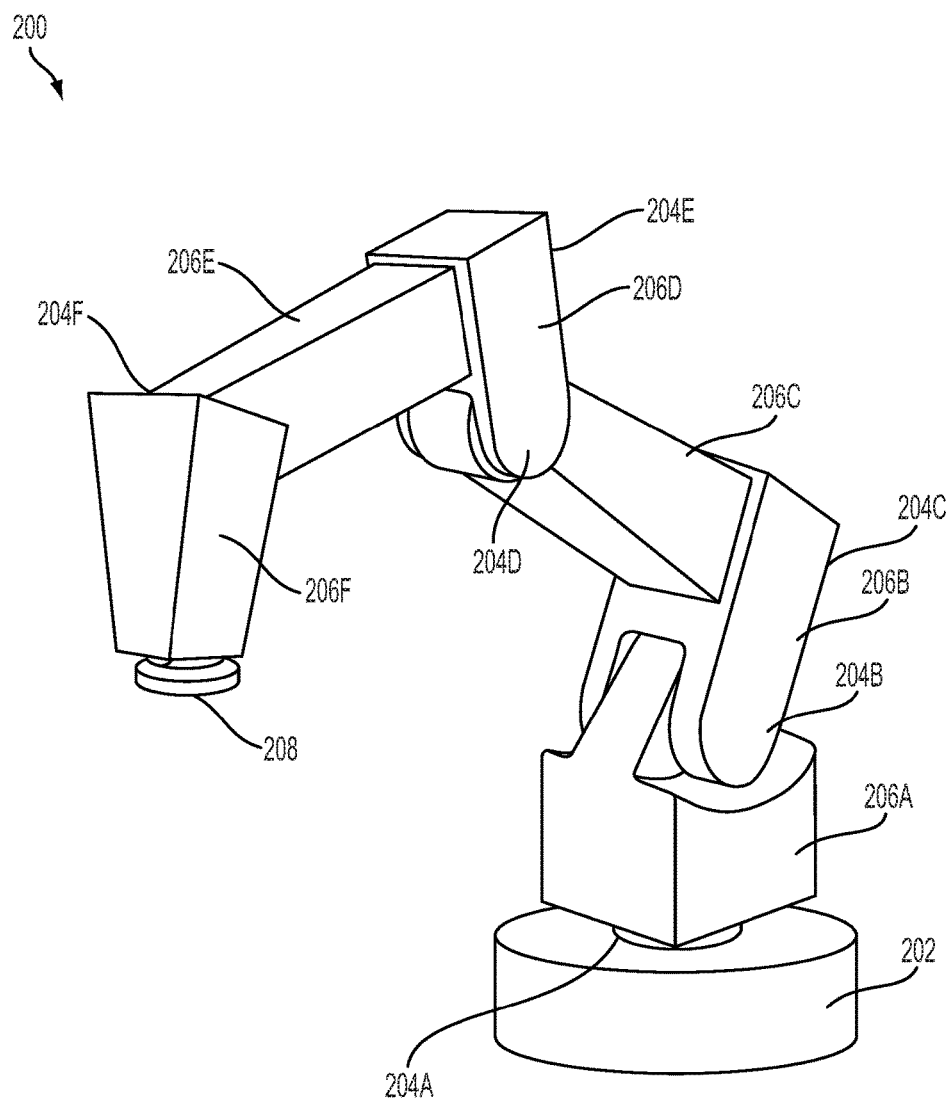
FIG. 2 illustrates a robotic arm, according to an example implementation.

A robotic system 100 may take on various forms. To illustrate, refer to FIG. 2 showing an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various movable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper or a suction gripper. In another example, the end effector may include sensors such as force sensors, location sensors, and/or proximity sensors. In yet another example, end effector 208 may take the form of a tool, such as a fabrication tool. Other examples may also be possible.

Given this arrangement, a robotic system 100, such as robotic arm 200 or any other machinery, may assist with or otherwise carry out fabrication of one or more objects. In particular, as noted, the robotic system 100 may have one or more fabrication tools and the robotic system 100 may use one or more of those fabrication tools to fabricate an object out of a substrate. These fabrication tools may include a cutter, a slitter, a drill, a saw, a blade, and/or a polisher, among others. Additionally, the robotic system may receive fabrication instructions (e.g., from a control system) in accordance with which the robotic system may fabricate an object. These instructions may specify a tool to be used, a portion of a substrate to be removed, an extent of the portion that should be removed, a shape in accordance with which the portion should be removed, and/or an order of fabrication, among any other feasible instructions. Other arrangements are possible as well.

B. Example Environment

Figure 3:
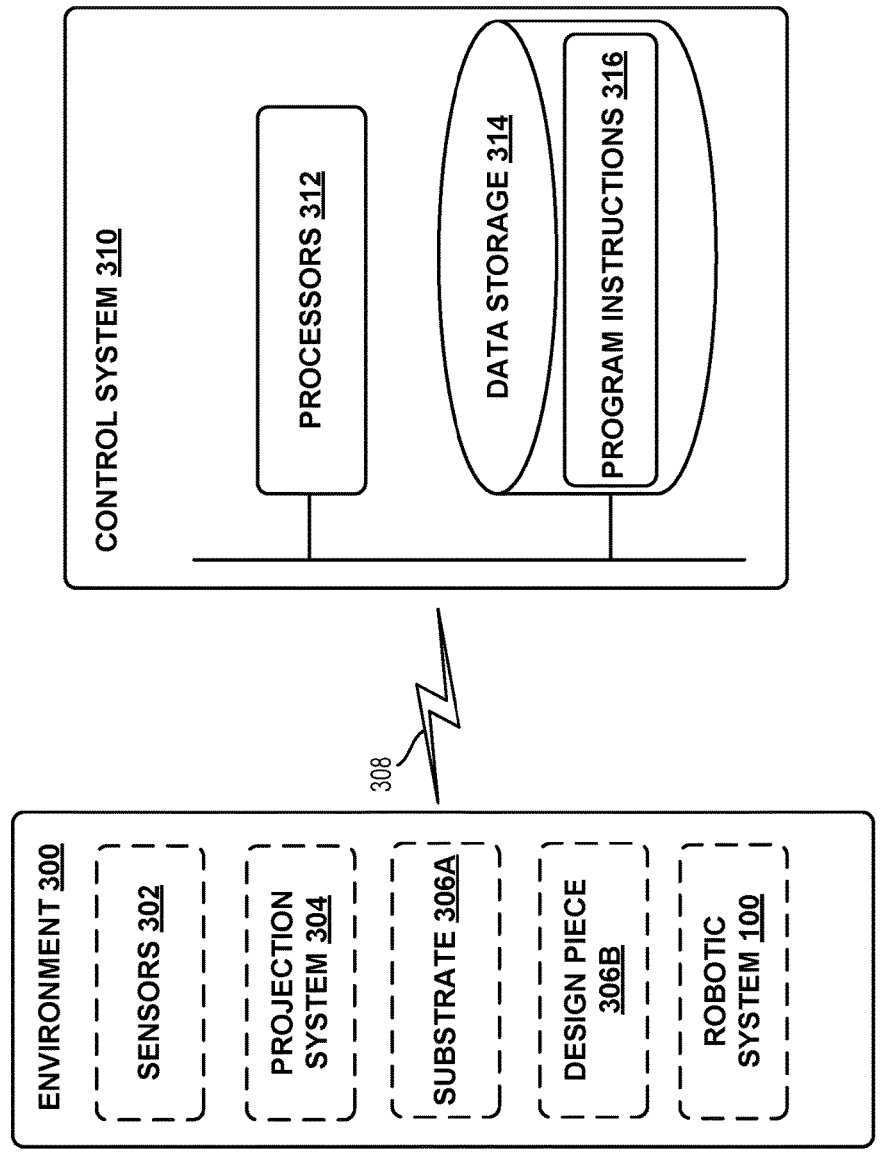
FIG. 3 illustrates a configuration of an environment and a configuration of a control system, according to an example implementation.

FIG. 3 next shows an example environment 300 that has one or more sensors 302 as well as a projection system 304, and in which a substrate 306A and/or a design piece 306B and possibly also the robotic system 100 may be found. The environment 300 may define at least one physical space in which people, objects, and/or machines may be located. Thus, the environment 300 may take on a two-dimensional (2D) or a three-dimensional (3D) form and may be used for various purposes. For example, the environment 300 may be a manufacturing facility where the fabrication and/or manufacturing of objects is carried out. In other examples, the environment 300 may be a distribution facility, an office space, a shopping center, and/or, a living space, among various other examples.

In some arrangements, the environment 300 may be a single physical space in which both object design and object fabrication take place. In such arrangements, a single space may thus include both a design environment for object design and a fabrication environment (also referred to as a work site) for object fabrication. In practice, object design may be defined as any actions taken to result in a model of a desired object, which may generally occur before a robotic system 100 begins fabricating the desired object. But object design could also occur during fabrication of a desired object. Furthermore, object fabrication may be defined as any actions taken to physically create a desired object. Generally, such object fabrication may start when a first permanent physical change to a substrate 306A is made, such as a first cut or a first etch, among others.

In other arrangements, the environment 300 may be at least two physical spaces, perhaps one of which may be used as a design environment for object design and the other may be used as a fabrication environment (work site) for object fabrication. In such arrangements, each physical space may respectively include any combination of the above-mentioned components and/or entities. By way of example, a first physical space of the environment 300 may take the form of a design environment and could thus include one or more of the sensors 302, a projection system 304, and a design piece 306B. In contrast, a second physical space of the environment 300 may take the form of a fabrication environment and could thus include one or more of the sensors 302, a projection system 304, a substrate 306A, and a robotic system 100. Various other arrangements are also possible.

Example sensors 302 in the environment 300 may include but are not limited to: force sensors, proximity sensors, motion sensors (e.g., an inertial measurement units (IMU), gyroscopes, and/or accelerometers), load sensors, position sensors, thermal imaging sensors, facial recognition sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others.

In a specific example, the sensors 302 may include an arrangement that allows a user to interact with the disclosed system without necessarily having to physically touch a device so as to provide input to the device (e.g., type on a keyboard). The system may thus include motion and/or speech sensing input device(s) (e.g., using RGB-D and/or other sensors). Given this arrangement, the control system 310 described below may receive sensor data from such device(s) and may use this sensor data to determine gestures (e.g., hand gestures such as a "tap", a "swipe", a "grab", and/or an "expand gesture, among others) and/or spoken commands based on which the control system 310 may then carry out further operations. Other examples are possible as well.

Moreover, the sensors 302 may be positioned within or in the vicinity of the environment, among other possible locations. Further, an example implementation may also use sensors incorporated within existing devices such as mobile phones, laptops, and/or tablets. These devices may be in possession of users located in the environment 300, among other possibilities. Additionally or alternatively, an example implementation may also use sensors incorporated within a system found within the environment 300, such as by using one or more of the sensors 110 of the robotic system 100 for instance. Other example implementations are also possible.

Further, the projection system 304 may include at least one projector configured to provide a projection onto a surface (e.g., onto the substrate 306A and/or onto the design piece 306B as further discussed below). Also, the projection system 304 may take on any form and may be arranged within the environment 300 in any feasible manner. For example, a projector may be mounted on a ball mount or another mechanical feature that is operable to rotate and/or move the projector such that the projection remains steadily projected and/or so as to move the projection. Additionally or alternatively, the projector may include a lens mechanism that is configured to move the projection. Further, in some examples, the projector may be mounted on a robotic arm, such as robot arm 200, or on a 2-axis mount configured to move the projector. Other examples and may also be possible.

Moreover, the projection system 304 (and perhaps the control system 310 that directs the projection system 304 to carry out operations) may be configured to use any projection techniques currently known or developed in the future. For instance, the projection system 304 may be configured to carry out projection mapping, which is a projection technology used to turn any 2D or 3D piece of material of any shape into a display surface for video projection. According to an example projection mapping technique, a piece of material may be spatially mapped on a computer program which mimics the environment 300 (e.g., based on sensor data) and the program may use such mapping as basis for fitting any desired projection onto the piece of material (e.g., within the outline of the piece and/or according to a current shape of the piece). Other arrangements are also possible.

Yet further, the substrate 306A may be any physical piece of at least one material that may be worked on to fabricate a desired object, such as by being cut or otherwise shaped into the desired object by one or more tools. By way of example, the substrate 306A could be a piece of metal and/or polyurethane, or could be a wall made of wood or any other solid building material that could be cut out, among others. In practice, the robotic system 100 discussed above may be configured to carry out fabrication of the desired object out of the substrate 306A, such as by using one or more of the tools describe above for instance. Moreover, the shape of the desired object (and perhaps other aspects of the fabrication process) may be determined based on model data (and/or other forms of data) as further discussed below.

Furthermore, the design piece 306B may be any physical piece of at least one material (e.g., also metal and/or polyurethane foam) that may be arranged to assist with design of the desired object. In one case, the design piece 306B may be the substrate 306A itself and thus both object design and object fabrication may be carried out using the same piece of at least one material. In another case, the design piece 306B may be representative of the substrate 306A and thus object design may be carried out using the design piece 306B and the desired object may then be fabricated out of the substrate 306A in accordance with the object design. In practice, the design piece 306B being representative of the substrate 306A may involve the design piece 306B having one or more of the same characteristics of the substrate 306A, such as by having substantially the same shape, size, form, color, and/or material, among others. Additionally or alternatively, the design piece may 306B may have at least one different set of characteristics than those of the substrate 306A. Other cases are possible as well.

C. Example Control System

FIG. 3 also illustrates a control system 310 that may include processors 312, data storage 314, and program instructions 316. Note that the control system 310 is shown for illustration purposes only as control system 310 may include additional components and/or have one or more components removed without departing from the scope of the disclosure. Further, note that the various components of control system 310 may be arranged and connected in any manner. Yet further, the above description of processor(s) 102, data storage 104, and program instructions 106, may apply to any discussion below relating to the respective component being used in another system or arrangements. For instance, as noted, FIG. 3 illustrates processors, data storage, and program instructions as being incorporated in another arrangement. These components at issue may thus take on the same or similar characteristics (and/or form) as the respective components discussed above in association with FIG. 1. However, the components at issue could also take on other characteristics (and/or form) without departing from the scope of the disclosure.

In practice, the control system 310 may take on one of various forms. For instance, the control system 310 may take the form of a chip set, a server system, a digital signal processor, a programmable logic controller, and/or a sampled-data system, among other possibilities. Moreover, the control system 310 may be located within the environment 300, may be located outside of the environment 300, and/or may be distributed across various locations, among other options. By way of example (and without limitation), the control system 310 may be located within a design environment of the environment 300 and thus a user may be located in the design environment while remotely monitoring and/or controlling fabrication that is carried out in a physically separate fabrication environment of the environment 300. Other examples are also possible.

In some cases, the control system 310 may be incorporated within and/or may otherwise be in communication with a computing system (not shown). In such cases, the computing system may take the form of a desktop computer, a laptop, a tablet, a wearable computing device, and/or a mobile phone, among other possibilities.

As such, the computing system may be configured to receive input from a user, such as via a graphical user interface (GUI) for instance. Generally, this input may be specifically provided via touch-based interface (e.g., a touch screen) or via a keyboard or the like. Also, this input may be representative of a shape of a desired object and/or of any other model data, among others. In particular, the model data may specify a 3D shape of the desired object, a size of the desired object, dimension of the desired object, and/or an orientation of the desired object once completed, among others. In this manner, the control system 310 may ultimately receive model data defining a 3D shape of a physical object fabricable out of the substrate 306A.

As further shown in FIG. 3, the control system 310 may be in communication with the various entities found in the environment 300 via at least one communication link 308. This communication link 308 may be a wired or a wireless communication link. More specifically, a wired link may include, for example, a parallel bus or a serial bus such as a Universal Serial Bus (USB). Whereas, a wireless link may include, for example, Bluetooth, NFC, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11). In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

As such, the control system 310 may be in communication with sensors 302 and may thus receive (e.g., continuously or periodically) sensor data from one or more of the sensors 302. In practice, this sensor data may take the form of one or more data packets and may provide environment information representative of the environment 300. Additionally, the control system 310 may be in communication with the projection system 304. In this way, the control system 310 may transmit instructions to the projection system 304 so as to direct the projection system 304 to emit one or more particular projections and perhaps direct the projection system 304 to emit the projection onto a specified location within the environment 300. By way of example, the control system 310 may direct the projection system 304 to emit onto the design piece 306B a projection illustrative of the 3D shape of a physical object to be fabricated out of the substrate 306A, thereby helping a user visualize how the desired object may end up looking in the real world once completed.

Further, the control system 310 may be in communication with the robotic system 100. In this way, the control system 310 may transmit instructions to the robotic system 100 so as to direct the robotic system 100 to fabricate the physical object out of the substrate 306A in accordance with model data defining the 3D shape of the desired object. Moreover, the control system 310 may receive communications from the robotic system 100, such as communications specifying fabrication progress for instance.

D. Illustrative Fabrication Environment

Figure 4A:
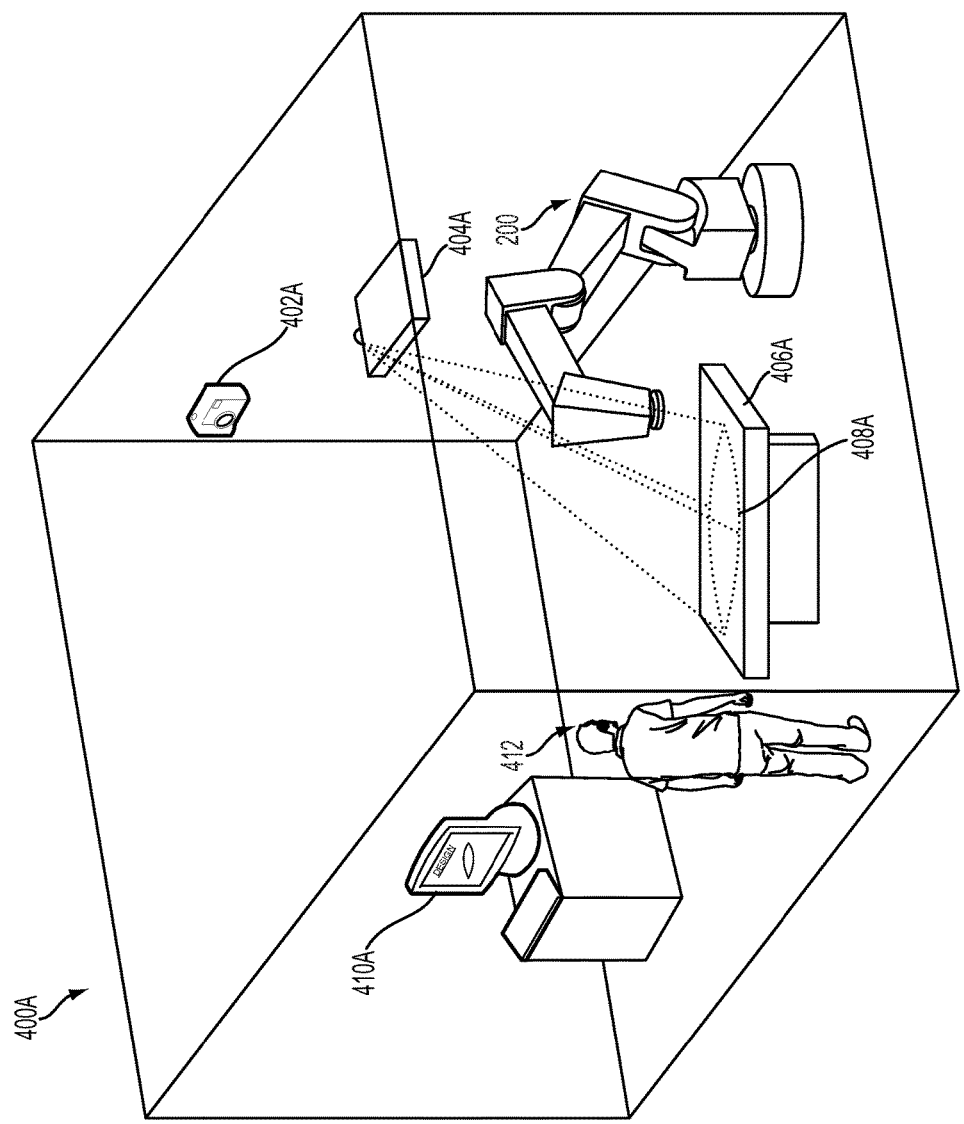
FIG. 4A to 4C illustrates various design and fabrication environments, according to an example implementation.

FIG. 4A next illustrates an example environment 400A that may be used as both a design environment as well as a fabrication environment. As shown, the environment 400A includes the robot arm 200, an example sensor 402A, an example projection system 404A, and an example computing system 410A. Also, an example substrate 406A is found within the environment 400A and the projection system 404A is shown as emitting projections 408A onto the substrate 406A. In this situation, the substrate 406A could also be used as a design piece for the purpose of object design. Further, a user 412 is also located within the environment 400A. And in some cases, other users could also be located within the environment 400A.

In an example scenario, the user 412 may design and/or select a 3D shape for the physical object to be fabricated out of the substrate 406A and may do so via the computing system 410A, among other options. For instance, the substrate 406A may be a piece of polyurethane foam and the user 412 may specify a 3D shape of a surfboard. Once specified, the projection system 404A may emit onto the substrate 406A projections 408A of the 3D shape of the surfboard. As discussed in more detail below, the projections 408A may dynamically change as the user moves around, so as to help the user visualize what the surfboard may look like from various vantage points. These vantage points may be determined based on sensor data received from the sensor 402A, among other options. And as also discussed in more detail below, the projections 408A may also be dynamically adjustable so as to allow for intuitive adjustments to the 3D shape of the surfboard. In this way, once the 3D shape is adjusted (and/or while adjusting the 3D shape), the robot arm 200 may fabricate the surfboard in accordance with model data defining the adjusted 3D shape of the surfboard.

Figure 4B:
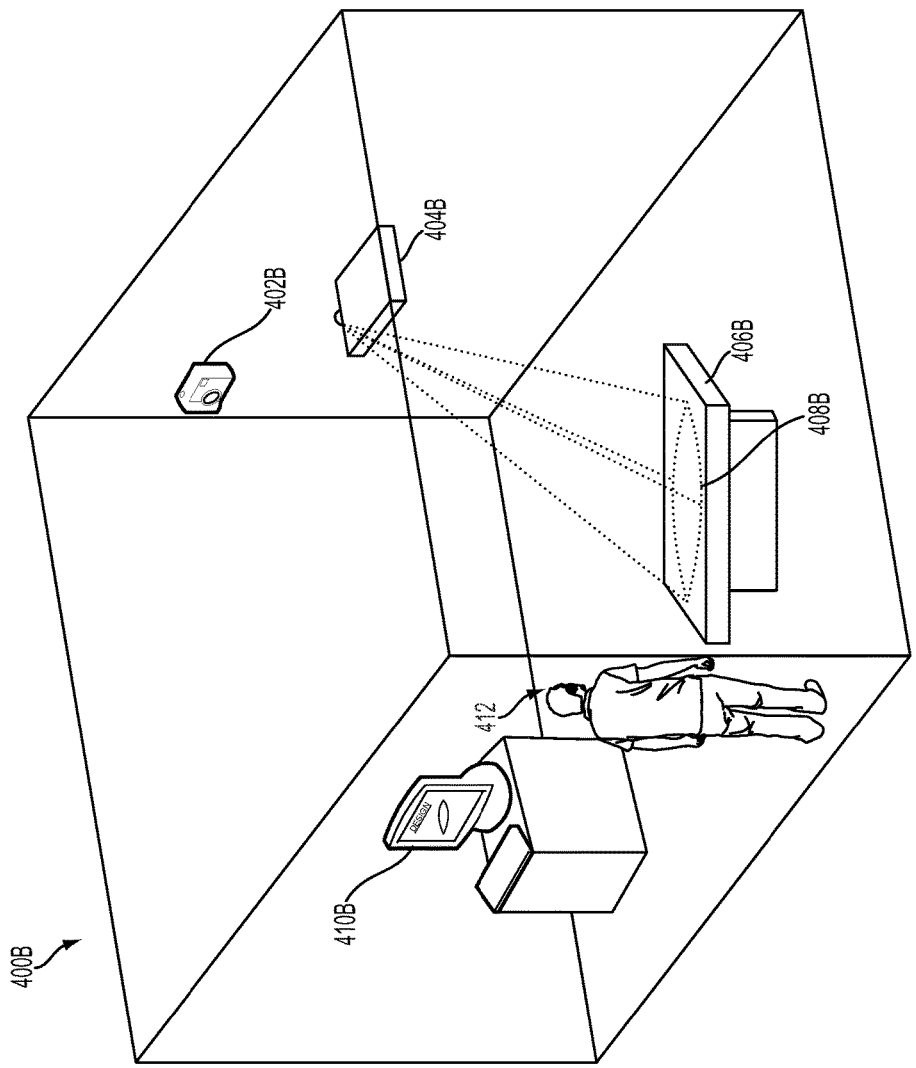
Figure 4C:
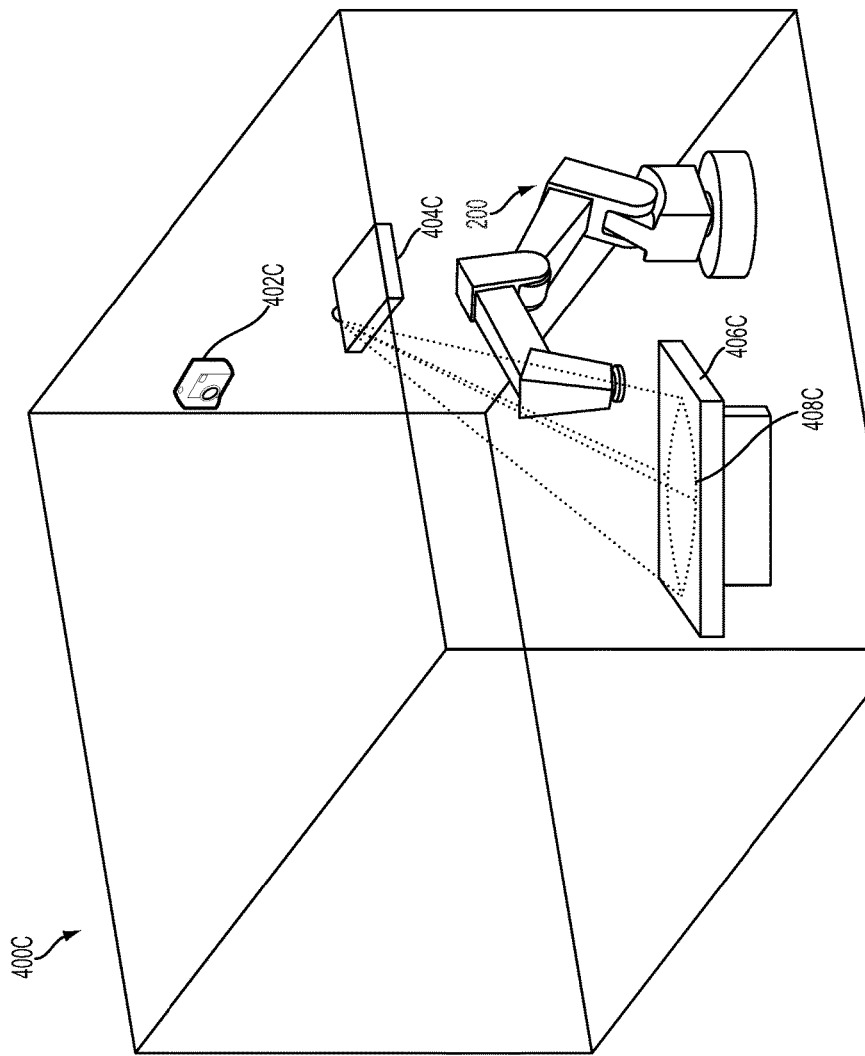

For sake of simplicity, various implementations disclosed herein may be described in the context of an environment including a single physical space for both object design and fabrication, such as environment 400A for instance. However, example implementations described herein may also be carried out in the context of an environment include two or more separate physical spaces for object design and fabrication. FIGS. 4B to 4C illustrate (without limitation) examples of such spaces.

In particular, FIG. 4B illustrates an example design environment 400B that includes an example sensor 402B, an example projection system 404B, and an example computing system 410B. Also, an example design piece 406B is found within the design environment 400B and the projection system 404B is shown as emitting projections 408B onto the design piece 406B. Further, a user 412 is also located within the design environment 400A. In practice, the sensor 402B, the projection system 404B, and/or the computing system 410B could feasibly take on the same or similar form as the respective component being described in FIG. 4A.

FIG. 4C then illustrates an example fabrication environment 400C (could also be referred to as an example work site 400C) that includes an example sensor 402C, an example projection system 404C, and the robot arm 200. Also, an example substrate 406C is found within the fabrication environment 400C and the projection system 404C is shown as emitting projections 408C onto the substrate, which may correspond to projections 408B. In this regard, the substrate 406C may be fabricated in accordance with an object design established (e.g., in ways further described below) using at least the design piece 406B. Further, in some cases, a computing system may also be located within the fabrication environment 400C. And in practice, the user 412 could move between the design environment 400B and the fabrication environment 400C or could simply remain within the design environment 400B during fabrication of the object in the fabrication environment 400C, among other possibilities. Moreover, the sensor 402C and/or the projection system 404C could feasibly take on the same or similar form as the respective component being described in FIG. 4A. Various other illustrations are also possible.

III. Dynamic Projections

A. Projections Based on Vantage Points

Disclosed herein are example implementations for a control system to adjust projections of a 3D shape of a desired physical object based on changing vantage points of one or more targets (e.g., users) of the disclosed system. These projection adjustments can be used to help a user visualize how the resulting desired object may respectively look from each of various vantage points once the object is ultimately fabricated. To illustrate, consider FIG. 5 showing an example method for adjusting projections based on vantage points.

Figure 5:
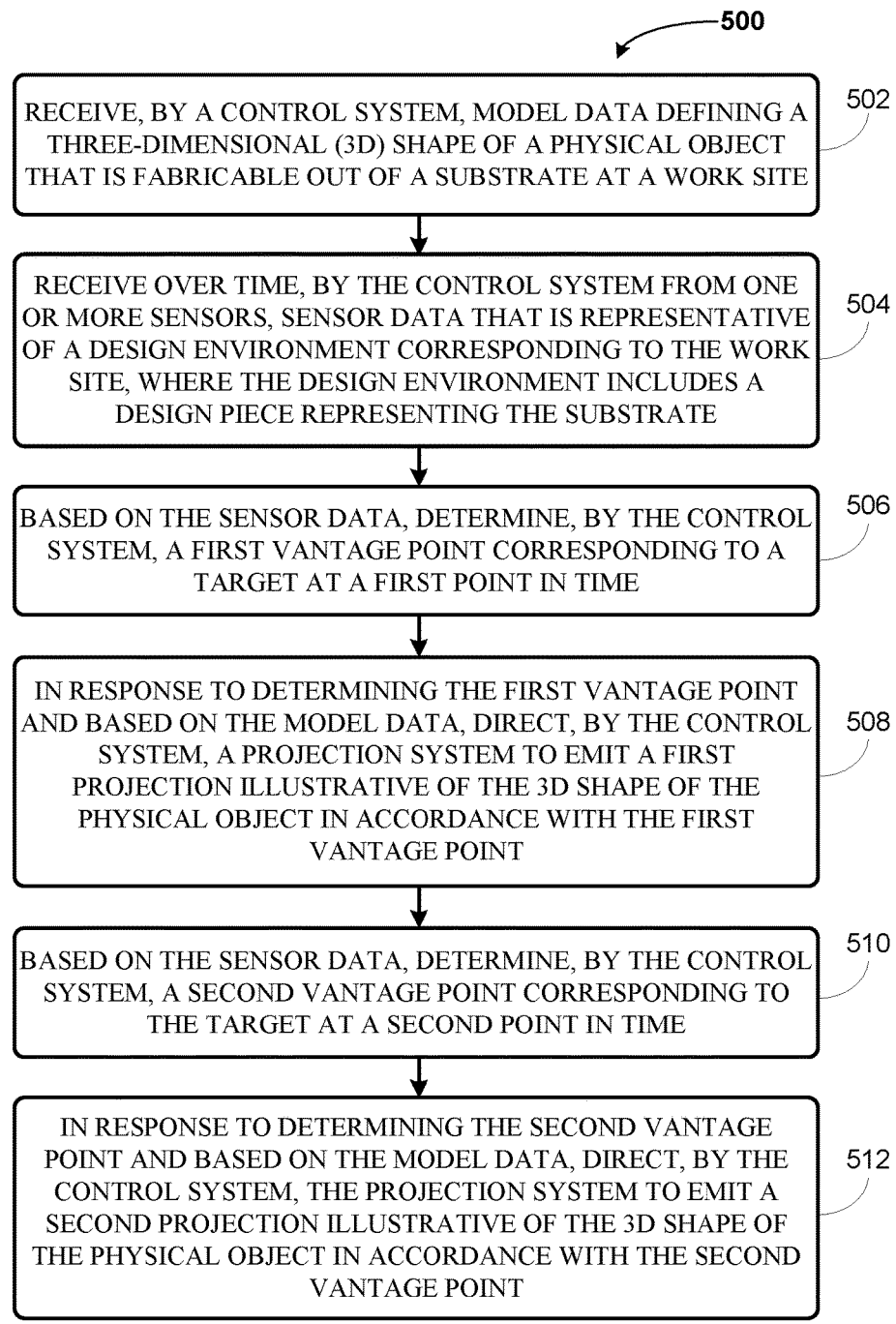
FIG. 5 is an example flowchart for adjusting projections based on vantage points, according to an example implementation.

FIG. 5 is a flowchart illustrating a method 500, according to an example implementation. Illustrative methods, such as method 500, may be carried out in whole or in part by a component or components in a control system, such as by the control system 310 described above. However, it should be understood that example methods, such as method 500, may be carried out by other entities or combinations of entities (e.g., by other devices and/or combinations of devices), without departing from the scope of the disclosure.

It should be understood that for this and other processes and methods disclosed herein, flowcharts show functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

As shown by block 502, method 500 involves receiving, by a control system, model data defining a three-dimensional (3D) shape of a physical object that is fabricable out of a substrate at a work site. And as shown by block 504, method 500 receiving over time, by the control system from one or more sensors, sensor data that is representative of a design environment corresponding to the work site, where the design environment includes a design piece representing the substrate.

For sake of simplicity, we may assume that the design piece at issue (e.g., design piece 306B) is the substrate itself (e.g., substrate 306A) and thus that any reference related to object design using a substrate 306A corresponds to object design using a design piece 306B. However, example implementation may extend to situations in which the design piece 306B is physically separate from the substrate 306A and is substantially representative of the substrate 306A. And in such situations, the substrate 306A may be ultimately fabricated based at least on object design carried out using the design piece 306B. Other implementations are also possible.

As noted, the control system 310 may receive model data and/or other data that provides information related to design (and/or fabrication) of an object. This model data may be received via an interface (e.g., GUI) through which a user can provide such information and/or may be determined based on sensor data, among other possibilities. In either case, the model data may define a 3D shape of a physical object (e.g., surfboard) that is to be fabricated out of a substrate (e.g., a piece of polyurethane foam). More specifically, as noted, the model data may define any feasibly characteristic of the desired object such as the 3D shape of the desired object, the size of the desired object, dimension of the desired object, and/or the orientation of the desired object once completed, among others.

Moreover, the various characteristics of the object may be defined in various ways. In one case, the control system 310 may receive via an interface input specifying information about a customized 3D shape of the desired object. For example, a user may use any modeling software or the like (e.g., currently known or developed in the future) to design the customized 3D shape. In another case, the control system 310 may receive via an interface input specifying a selection of a predefined 3D shape (e.g., a cylinder or a cube). In this case, the input may also specify size, dimensions, and/or orientation of the predefined 3D shape. In yet another case, the control system 310 may not receive input specifying a customized or a predefined 3D shape. Rather, the control system 310 may be arranged to simply have an initial 3D shape selected (e.g., upon initiating a new work session or the like) and then the control system 310 may receive input at a later point in time, so as to adjust that initial shape as further discussed herein. Other cases are also possible.

In some cases, the model data may also provide other information, which may be received via input and/or determined based on sensor data, among other options. In particular, the model data may provide information about the substrate 306A itself, such as information about location of the substrate 306A within the environment 300, a material of the substrate 306A, a current physical shape of the substrate 306A, and/or an orientation of the substrate 306A, among others. By way of example, the control system 310 may use sensor data (e.g., received from position sensors) to determine coordinates in physical space at which the substrate 306A is located with respect to a coordinate system defined by the environment 300. Also, the control system 310 may use sensor data (e.g., received from image sensors) to determine a current physical shape of the substrate 306A and/or a current orientation of the substrate 306A. Further, the control system 310 may receive input specifying the material of the substrate 306A. Other examples and types of information are also possible.

Further, as noted, the control system 310 may be in communication with sensors 302 and may thus receive (e.g., continuously or periodically) sensor data from one or more of the sensors 302. In practice, the control system 310 may use the sensor data to determine model data, to obtain information about the substrate 306A, to obtain information about the environment 300, to obtain information about the robotic system 100, to obtain information about fabrication progress, to determine a vantage point, and/or to help determine adjustments to the 3D shape. Other uses of the sensor data are possible as well.

As shown by block 506, method 500 involves, based on the sensor data, determining, by the control system, a first vantage point corresponding to a target at a first point in time. And as shown by block 508, method 500 involves, in response to determining the first vantage point and based on the model data, directing, by the control system, a projection system to emit a first projection illustrative of the 3D shape of the physical object in accordance with the first vantage point.

As the control system 310 receives sensor data over time, the control system 310 may use the sensor data as basis for determining within the environment 300 a vantage point corresponding to a target. As noted, the target may be a user, a device, or any other feasible device or entity. In case of a device, a user may move the device around the environment 300. Alternatively, a robot or other system may move the device around the environment 300 (e.g., based on input provided by a user) and a user could remotely view video data or the like provided by the device, so that the remote user can essentially have the device's vantage point. In either case, a vantage point may define a respective spatial location within the environment 300 that provides a respective point of view (POV) of the substrate 306A. In this way, the vantage point may essentially define a point in physical space from which the substrate 306A is being viewed or is otherwise observed by a user or by any other device or entity. For simplicity (and without limitation), however, the target at issue may generally be described herein as being a user.

More specifically, the control system 310 may define a vantage point as at least one coordinate within a coordinate system of the environment 300, so as to represent a location of the vantage point (e.g., location of a user) within the environment 300. And in a more specific example, a vantage point may be defined by the control system 310 as at least one coordinate within a coordinate system of the environment 300 relative to at least one coordinate defining the substrate 306A (e.g., as noted, with the design piece 306B being the substrate 306 itself), thereby being representative of a location of the vantage point within the environment 300 relative to a location of the substrate 306A within the environment 300. As such, the control system 310 may determine the vantage point in various ways and may do so from time-to-time (e.g., continuously or periodically) or in response to other factors.

By way of example, the control system 310 may receive image data from one or more image sensors. Based on the received image data, the control system 310 may identify entities within the environment 300, such as based on image matching techniques currently known or developed in the future for instance. As such, the control system 310 may identify the user and may identify the substrate 306A and may then determine a location of the user compared to location of the substrate 306A within the image data. In another example, a sensor may move along with movements of the user and may provide information related to position of the user. For instance, the control system 310 may receive information from a user's mobile device and/or information from a tag worn by a user. So in this instance, the tag and/or the mobile device may include sensors that simply provide position data and/or may include a wireless signal emitter that emits wireless signals based on which a position may be determined (e.g., based on a determined strength of the wireless signal and/or based on a determined direction from which the wireless signal arrives). Other examples are also possible.

With these arrangements, the control system 310 may be configured to direct the projection system 304 to emit (e.g., onto the substrate 306A) a projection illustrative of a 3D shape of the desired object to be fabricated and to dynamically change the projection over time according to determined vantage points. More specifically, the control system 310 may determine a first vantage point within the environment at a first point in time and may responsively direct the projection system 304 to emit onto substrate 306A a first projection. That first projection may be based on the received model data and may be arranged to illustrate the 3D shape of the desired object from the first vantage point, thereby allowing a user having that first vantage point to visualize how the resulting desired physical object may look from that first vantage point once the physical object is ultimately fabricated.

In practice, the control system 310 may use one of various techniques to generate the image illustrated by that first projection. For instance, the model data may include information specifying a 3D model (e.g., a wire-frame model) of the desired object with that information specifically being one or more mathematical representations of the 3D shape. Moreover, that information may specifically define visual characteristics of the 3D model from each of various vantage points, such as by having a mathematical representation of the 3D shape for each of various possible POVs of the desired object. With this arrangement, each vantage point may correspond to certain visual characteristics of the 3D model, such as through mapping data (e.g., accessible to the control system 310) that maps certain vantage points respectively to certain mathematical representations. So once the control system 310 determines the first vantage point, the control system 310 may determine corresponding first visual characteristics of the 3D model. Then, the control system 310 may use 3D rendering techniques (e.g., wire-frame rendering or scanline rendering) to convert the 3D model having those first visual characteristics into a 2D image having a 3D effect representative of the 3D shape of the object from the first vantage point. And the control system 310 may then direct the projection system 304 to emit a first projection illustrative of that 2D image, thereby providing the 3D effect. Other examples are also possible.

Figure 6A:
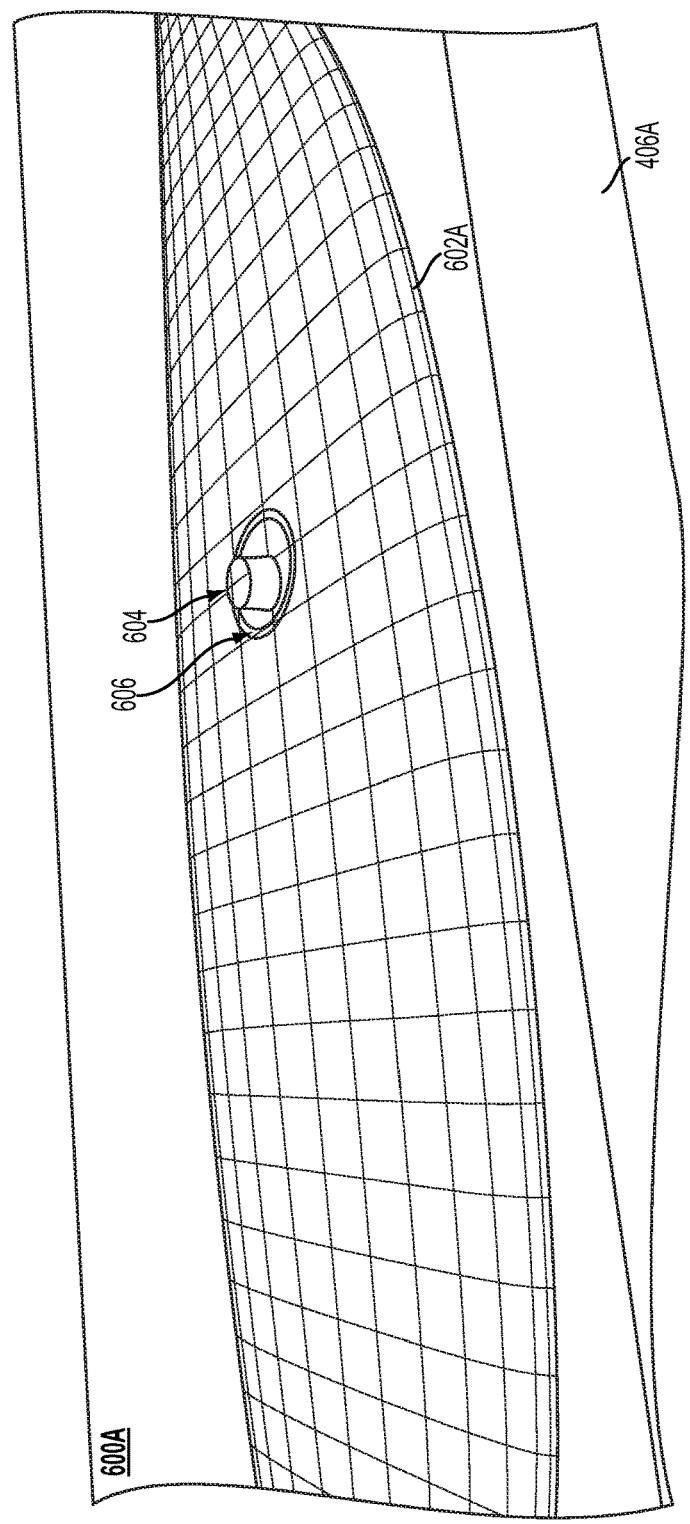
FIGS. 6A to 6B illustrate projections that adjust based on respective vantage points, according to an example implementation.

FIG. 6A illustrates a first vantage point 600A defining a first POV of the user 412 and also illustrates a first projection 602A emitted onto the example substrate 406A in accordance with that first vantage point 600A. As shown, the first projection 602A is arranged to provide a 3D effect representative of the desired 3D shape of the surfboard. Moreover, the 3D effect is specifically illustrative of the 3D shape of the surfboard from the first POV. In this way, the first projection 602A may help the user 412 visualize how the resulting surfboard may look from that first vantage point 600A once the surfboard is ultimately fabricated out of the substrate 406A. Other illustrations are also possible.

As shown by block 510, method 500 involves, based on the sensor data, determining, by the control system, a second vantage point corresponding to the target at a second point in time. And as shown by block 510, method 500 involves, in response to determining the second vantage point and based on the model data, directing, by the control system, the projection system to emit a second projection illustrative of the 3D shape of the physical object in accordance with the second vantage point.

Once the control system 310 directs the projection system 304 to emit the first projection, the control system 310 may use sensor data as basis for determining a second vantage point within the environment 300 at a second point in time (e.g., after the above-mentioned first point in time). In practice, the second vantage point may be different from the first vantage point, such as by defining a different spatial location that provides a different POV compared to that of the first vantage point. Alternatively, the second vantage point may that same as the first vantage point, such as by defining the same spatial location that provides the same POV provided by the first vantage point. Moreover, the second vantage point may be a vantage point of the same target (e.g., same user) that had the first vantage point or may be a vantage point of a different target (e.g., different user) than the one that had the first vantage point.

Nonetheless, the control system 310 may respond to determining the second vantage point by directing the projection system 304 to emit (e.g., onto the substrate 306A) a second projection illustrative of the 3D shaped of the physical object from a second POV defined by the second vantage point. As such, that second projection may also be based on the received model data but, in this instance, may be arranged to illustrate the 3D shape of the desired physical object from the second vantage point, thereby allowing a user having that second vantage point to visualize how the resulting desired object may look from that second vantage point once the object is ultimately fabricated.

Furthermore, the control system 310 may use any of techniques discussed above in the context of the first projection to generate the image illustrative by that second projection. For example, once the control system 310 determines the second vantage point, the control system 310 may determine corresponding second visual characteristics of the above-mentioned 3D model. Then, the control system 310 may use 3D rendering techniques to convert the 3D model having those second visual characteristics into a 2D image having a 3D effect representative of the 3D shape of the object from the second vantage point. And the control system 310 may then direct the projection system 304 to emit a second projection illustrative of that 2D image, thereby again providing the 3D effect. Other examples are also possible.

Figure 6B:
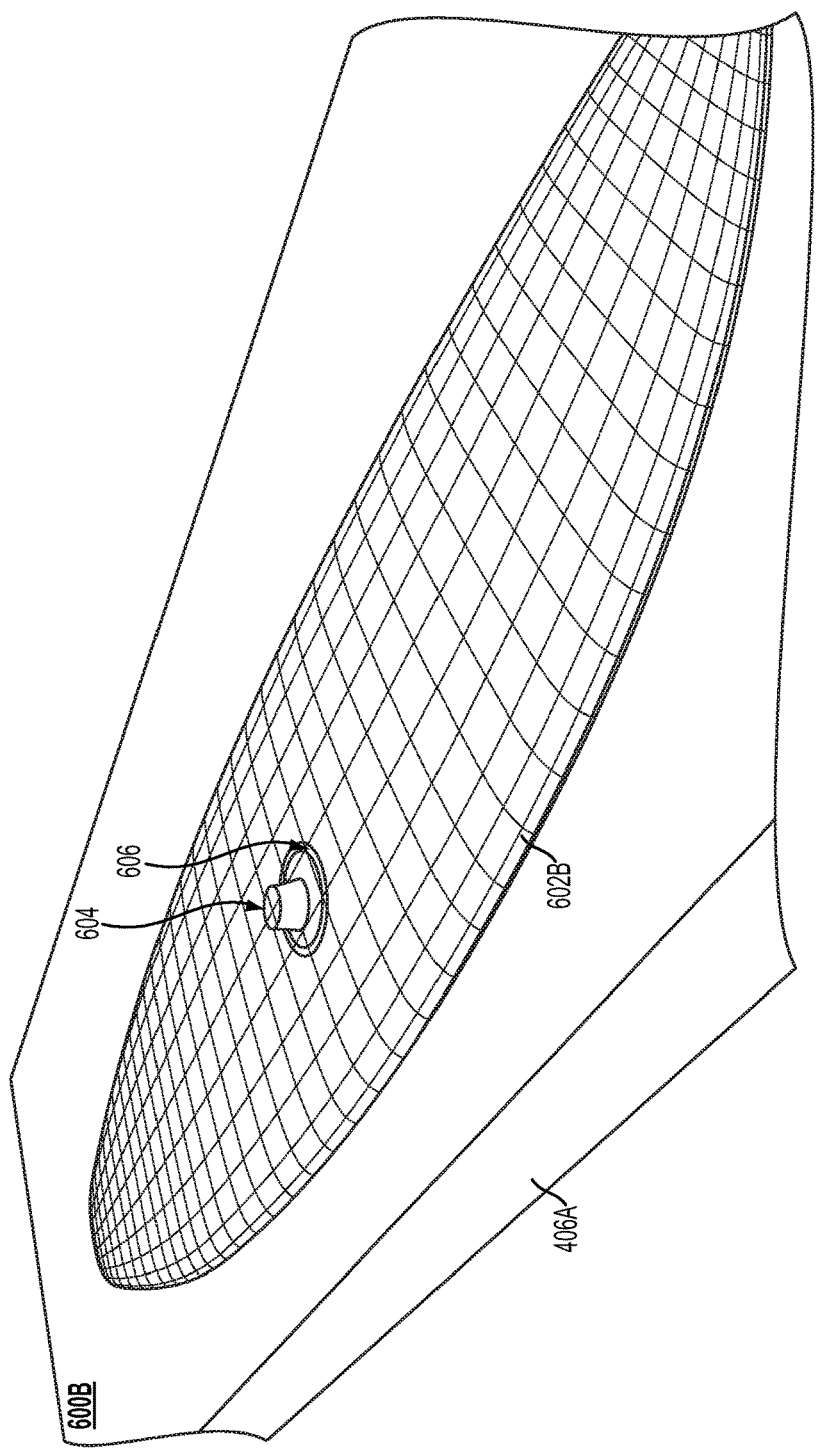

FIG. 6B next illustrates a second vantage point 600B defining a second POV of the user 412 and also illustrates a second projection 602B emitted onto the example substrate 406A in accordance with that second vantage point 600B. As shown, the second projection 602B is also arranged to provide a 3D effect representative of the desired 3D shape of the surfboard. Compared to FIG. 6A, however, the 3D effect in this case is specifically illustrative of the 3D shape of the surfboard from the second POV. In this way, the second projection 602B may help the user 412 visualize how the resulting surfboard may look from that second vantage point 600B once the surfboard is ultimately fabricated out of the substrate 406A. Other illustrations are also possible.

In a further aspect, the control system 310 may further adjust the projection representative of the 3D shape based on there simultaneously being multiple vantage points within the environment 300. In particular, the control system 310 may determine at least first and second vantage points simultaneously within the environment 300 and may responsively direct the projection system 304 to project a 2D projection of the desired shape. In this way, the control system 310 ensures a fair viewing experience when multiple entities are simultaneously viewing the projections.

B. Projections Associated with a Physical Item

In a further aspect, the control system 310 may be configured to use sensor data to detect within the environment a particular physical item that could be used as an input mechanism for providing instructions to the control system 310. For example, the control system 310 may detect (e.g., using image matching techniques) a cylindrical wooden block and may determine that the detected cylindrical wooden block could be used as an input mechanism. In another example, the physical item may be any electronic device having an associated identifier. So in this example, the control system 310 and the electronic device may carry out wireless handshake signaling or the like until the control system 310 identifies the electronic device as an item that could be used as an input mechanism. Moreover, the control system 310 may be configured to use sensor data (e.g., position and/or image data) to detect particular movements of the physical item and/or particular hand gestures carried out with or relative to the physical item, among other possibilities. These particular movements and/or gestures may then be use respectively to provide particular instructions to the control system 310.

In this aspect, the control system 310 may have stored thereon or otherwise have access to a database of physical items, such as a database of respective images of physical items and/or a database of respective identifiers of physical items, among others. Additionally, the database may include information that maps certain movements and/or certain gestures to certain instructions. With this arrangement, the control system 310 may refer to the database when detecting the particular physical item and/or determining particular instructions based on detection of particular movements and/or gestures. Moreover, the database may be adjustable based on input provided by a user (e.g., via an interface). In practice, the adjustments to the database may involve addition of a physical item to the database and/or removal of a physical item from the database (e.g., addition and/or removal of an image and/or of an identifier). Also, the adjustments to the database may involve addition, removal, and/or modification of mapping data that maps certain movements and/or certain gestures to certain instructions. In this way, a user may essentially use any feasible physical item to provide instructions to the control system 310 and those instructions may be provided in any feasible manner.

In some cases, the control system 310 may be configured to use sensor data to detect that the particular physical item is in a specific location within the environment 300. For instance, the control system 310 may specifically detect that the particular physical item is positioned on the substrate 306A. The control system 310 may do so in various ways. For example, the control system 310 may receive image and/or position data and, based on such data, may determine a position of the substrate 306A as well as a position of the particular physical item. Once those positions are determined, the control system 310 may determine whether the position of the particular physical item substantially matches (e.g., is within a distance threshold of) the position of the substrate 306A (e.g., as noted, with the substrate 306A being a design piece 306B). Other examples are also possible.

Once the control system 310 detects the particular physical item, the control system 310 may responsively direct the projection system 304 to emit particular projections associated with the detecting of the particular physical item. In an example implementation, the particular projections may be emitted in addition to or instead of the above-described first and/or second projections. More specifically, the particular projections may be illustrative of features related to the detected physical item, such as shape, location, and/or size of the physical item. So in this regard, the control system 310 may generate and/or select one or more images based on such images being illustrative of various features of the physical item. For instance, the control system 310 may select an image of a circular ring based on the physical item having a cylindrical shape. As such, after generating and/or selecting one or more images, the control system 310 may direct the projection system 304 to emit the particular projections such that the projections are illustrative of those images.

Additionally or alternatively, the particular projections may be indicative of instructions that the particular physical item is providing or is capable of providing to the control system 310. For instance, attributes of the particular projections (e.g., the color, shape, location, and/or size of the particular projection) may change based on the particular movements and/or gestures being provided. In another instance, attributes of the particular projections may change based on an operating mode of the control system 310. In this manner, the particular projections may be illustrative of the particular physical item and may allow a user to visualize any instructions that the user is providing to the control system 310 using the physical item and/or to see visual indications related to operating modes, which are discussed in further detail below.

Furthermore, the control system 310 may direct the projection system 304 to dynamically change the particular projections over time according to determined vantage points. In particular, in response to determining the above-mentioned first vantage point, the control system 310 may direct the projection system 304 to emit a first particular projection illustrative of the particular physical item in accordance with the first vantage point. And in response to determining the above-mentioned second vantage point, the control system 310 may direct the projection system 304 to emit a second particular projection illustrative of the particular physical item in accordance with the second vantage point.

By way of example, attributes of the particular projections (e.g., the color, shape, location, and/or size of the particular projection) may change based on the determined vantage point. For instance, in response to detection of the first vantage point, the control system 310 may direct the projection system 304 to emit a first particular projection onto a first location relative to a current location of the particular physical item. And in response to detection of the second vantage point, the control system 310 may direct the projection system 304 to emit a second particular projection onto a second location relative to the current location of the particular physical item. Moreover, adjusting the location of the particular projections based on change in vantage points may occur while projection of the 3D shape is also adjusted based on change in vantage points. In this manner, a change in vantage points may also ultimately result in adjustments to projections other than just those illustrative of the 3D shape. Other examples are also possible.

Referring again to FIG. 6A, a cylindrical block 604 is shown as positioned on the example substrate 406A and a projected ring 606 is shown surrounding the cylindrical block 604. Moreover, the projected ring 606 is projected onto the substrate 406A at a certain location such that the cylindrical block 604 appears to be positioned slightly away from the center of the ring in a direction corresponding to location of the user 412 having the first vantage point 600A. In contract, at FIG. 6B, the cylindrical block 604 remains at the same location as in FIG. 6A. However, the projected ring 606 is projected onto the substrate 406A at a different location such that the cylindrical block 604 appears to be positioned slightly away from the center of the ring in a direction corresponding to location of the user 412 having the second vantage point 600B. In this manner, the projected ring 606 is illustrative of features of the cylindrical block 604 and the projections of the projected ring 606 may change so as to help the user 412 visualize the change in vantage points. Other illustrations are also possible.

In a further aspect, if multiple entities are positioned within the environment 300, then the control system 310 may use various factors, some of which may be related to the physical item, in order to determine characteristics of various projections. For instance, the control system 310 may solely carry out operations based on movements of the physical item, thereby essentially focus on the entity handling the physical item. Additionally or alternatively, the control system 310 may also receive information related to other entities that are not handling the physical item and such information may also be used as basis for determining the projections. For example, the control system 310 may determine a particular entity positioned within a threshold distance of the substrate 306A and may responsively direct the projection system 304 to reorient at least some projections (e.g., letters or other visuals) towards the direction of that particular entity. Other examples are also possible.

C. Default Projections

In an example implementation, the control system 310 may direct the projection system 304 to emit different projections in addition to or instead of any of the above-mentioned projections. These different projections may be illustrative of any of the following forms of information: particular textual information (e.g., a company name), a particular image (e.g., a company logo), and/or a particular pattern (e.g., a stripe pattern). Moreover, these different projections could be of any color and of any size and may be projected onto any feasible location, such as onto the substrate 306A and/or onto other locations in the environment 300.

Figure 7:
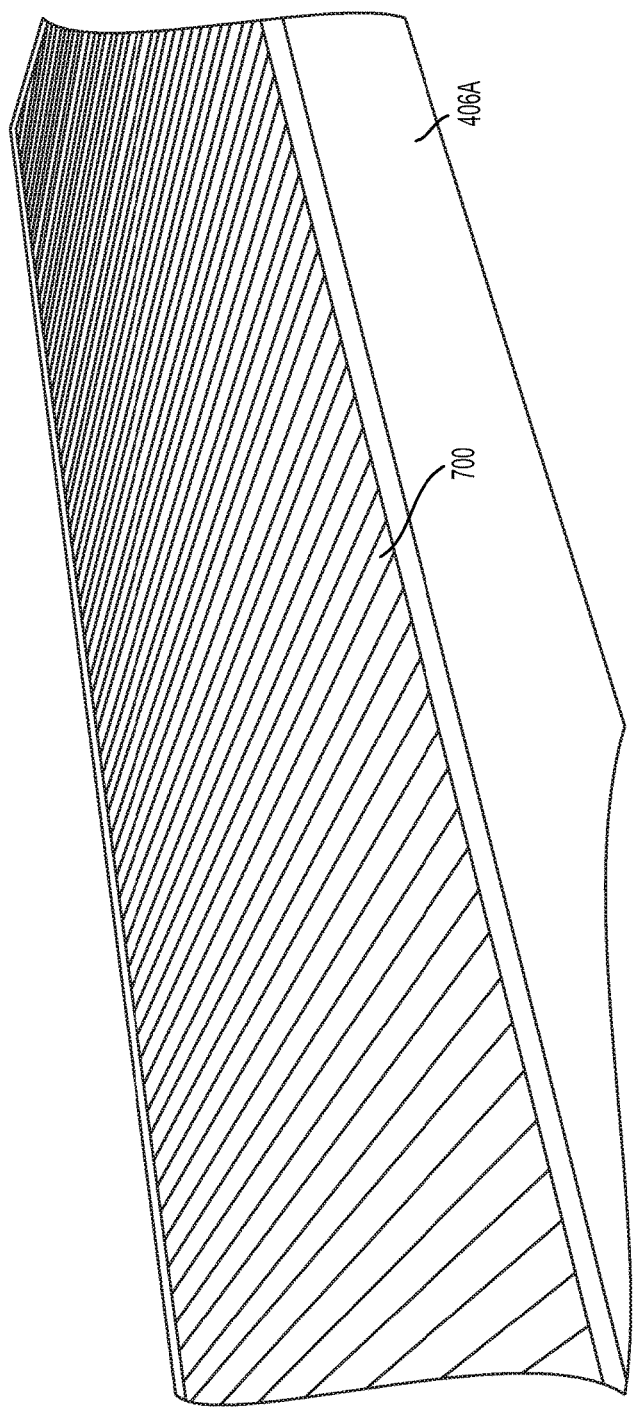
FIG. 7 illustrates a default projection, according to an example implementation.

In some situations, the control system 310 may direct the projection system 304 to emit such different projections at times when the above-mentioned particular physical item is not being detect by the control system 310, such as before detecting the particular physical item and/or after no longer detecting the particular physical item, among other possibilities. By way of example, FIG. 7 illustrates a particular pattern projection 700 being emitted onto the example substrate 406A at a time that the cylindrical block 604 is not being detected on the substrate 406A. Additionally or alternatively, the control system 310 may direct the projection system 304 to emit such different projections at times such as: immediately upon initiation of the disclosed system, upon completion of a fabrication design, and/or upon completion of object fabrication, among various other possibilities.

In this regard, the control system 310 may respond to detecting the particular physical item by directing the projection system 304 to emit another projection other than the different projections at issue. For instance, the control system 310 may respond to detecting the particular physical item (e.g., positioned on the substrate 306) by directing the projection system 304 to emit the above-mentioned first projection. And by replacing the different projections with the first projection illustrative of the 3D shape of the desired object, the control system 310 may essentially indicate to the user that the user can take further actions, such as to adjust the 3D shape and/or to change the vantage point, among others.

Moreover, when another projection other than the different projections at issue is already being emitted, the control system 310 may respond to no longer detecting the particular physical item by directing the projection system 304 to again emit the different projections at issue. For instance, the projection system 304 may be emitting the above-mentioned second projection and the control system 310 may respond to no longer detecting the particular physical item by directing the projection system 304 to no longer emit the second projection and instead again emit the different projection at issue. Other arrangements are also possible.

D. Projections of Menu Options

In some situations, the control system 310 may direct the projection system 304 to emit projections of one or more menu options each corresponding to a respective operating mode of the control system 310. In particular, these projections of menu options may take on any shape, size, and/or color, among other attributes. Additionally, these projections of menu options may be projected onto any feasible location within the environment 300, such onto a location on the substrate 306A (e.g., a corner and/or a side of a substrate 306A also acting as a design piece 306B) for instance. Moreover, the control system 310 may direct the projection system 304 to emit these menu options projections in response to determining that the above-mentioned particular physical item is positioned in a particular location within the environment 300, such as by being placed in a particular location on the substrate 306A.

Figure 8A:
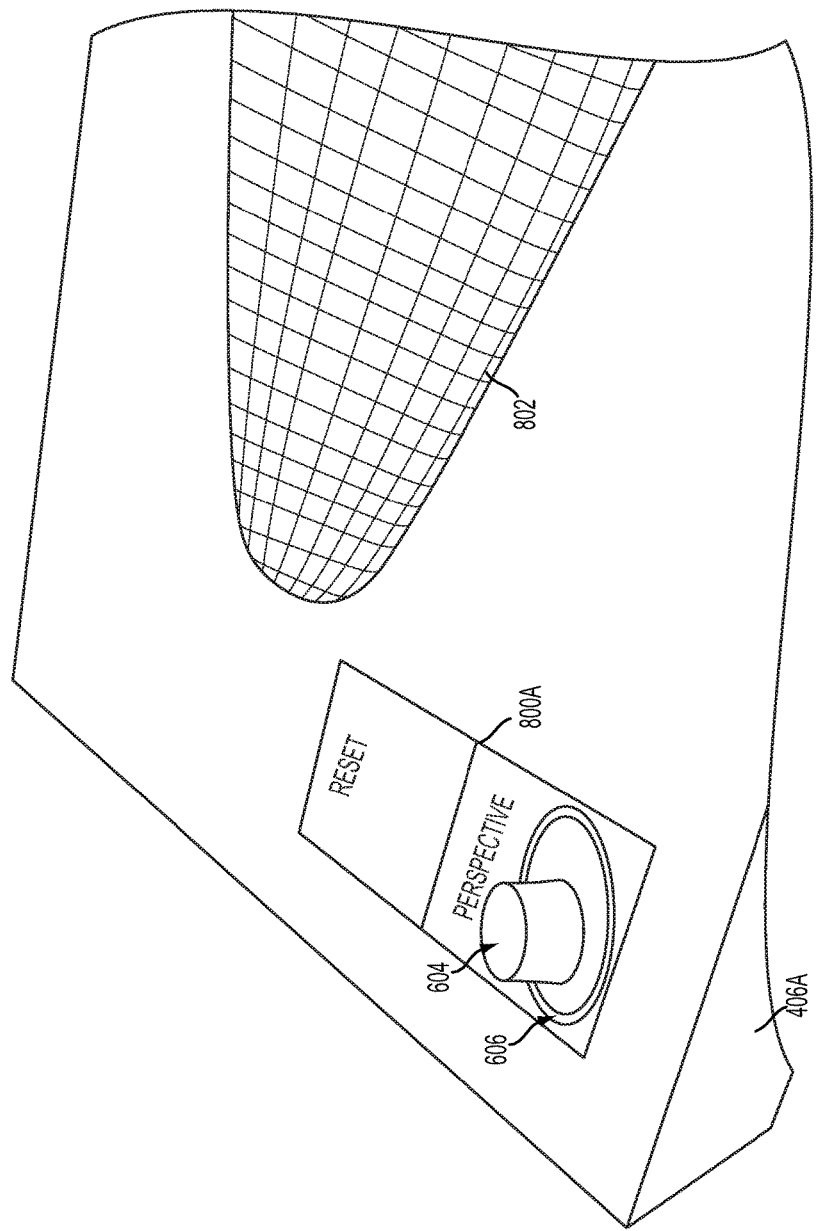
FIGS. 8A to 8B illustrate projections of menu options, according to an example implementation.
Figure 8B:
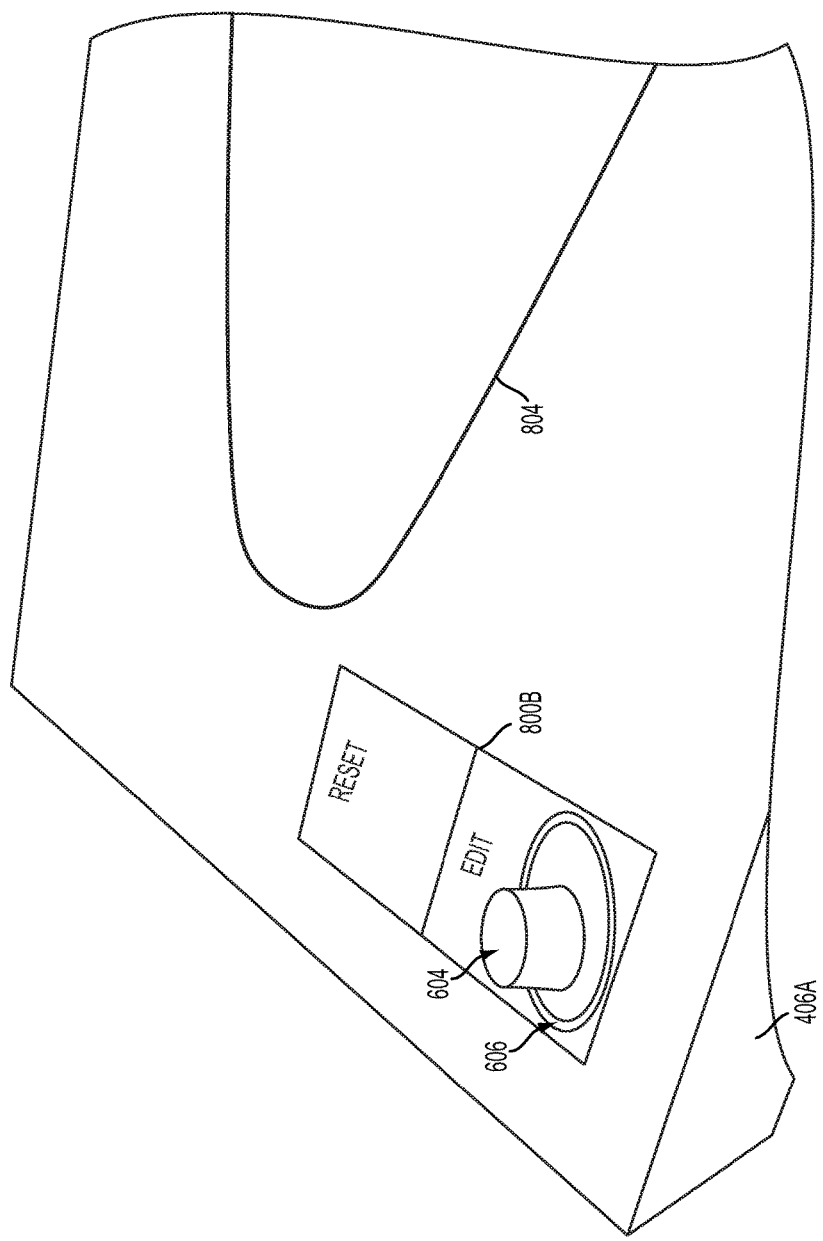

Once projected, these projections may include textual representations of the menu options, some of which may appear simultaneously and/or some of which may appear at different points in time. For example, as shown in FIG. 8A, menu options projections 800A may include a textual representation of the word "PERSPECTIVE" so as to represent a corresponding "perspective" operating mode, which is further discussed in more detail below. In another example, as shown in FIG. 8B, menu options projections 800B may include a textual representation of the word "EDIT" so as to represent a corresponding "editing" operating mode, which is also further discussed in more detail below. In yet another example, as shown respectively in FIGS. 8A to 8B, menu options projections 800A and 800B may include a textual representation of the word "RESET" so as to represent a corresponding "reset" operating mode, which is further discussed in more detail below. Other examples are also possible.

IV. Interactive Object Design

Given the above-described arrangements, the control system 310 may evaluate aspects related to the menu options projections as basis for determining when to initiate certain operating modes and/or when certain operations related to the operating modes should be carried out. More specifically, the control system 310 may be configured to detect that the particular physical item is positioned in a particular location within the environment 300. Once the control system 310 detects the particular location of the particular physical item, the control system 310 may be configured to detect that the particular location corresponds to (e.g., is within a threshold distance of) a location at which a particular menu option is projected. Responsively, the control system 310 may then initiate the particular operating mode corresponding to that particular menu option and perhaps may carry out other operations as well.

In this manner, a user may select among menu options projected onto the substrate 306A and could do so without necessarily having to carry out such selection via a computing device or the like, thereby potentially helping to speed up the work flow of the user. However, operating modes could nonetheless additionally or alternatively be selected through interaction with a computing device, such as by having the control system 310 receive via an interface on a computing device (e.g., GUI) input representative of a selection of a particular operating mode. These operating modes are described in more detail below.

A. Perspective Mode

In an example implementation, the control system 310 may be configured to operate in accordance with a perspective mode. In particular, the perspective mode is a mode during which the control system 310 is configured to direct the projection system 304 to emit onto the substrate 306A one or more projections illustrative of the 3D shape defined by the model data. Moreover, the projections emitted during the perspective mode may be arranged to dynamically change in accordance with a changing vantage point, such as in the manner described above. As such, the first and second projections 602A and 602A shown respectively in FIGS. 6A and 6B are examples of projections that may be emitted during the perspective mode.

Further, the control system 310 may be configured to detect that the particular physical item is position within the environment in a particular location that is associated with the perspective mode and may responsively initiate the perspective mode. For instance, this particular location may correspond to (e.g., be within a threshold distance of) a location at which the "PERSPECTIVE" menu option is projected and/or may be another location within the environment 300. Moreover, once the perspective mode is initiated, the control system 310 may then be configured to carry out one or more perspective mode procedures, which may include directing adjustment of projections in accordance with a changing vantage point, among other possibilities.

By way of example, FIG. 8A illustrates the cylindrical block 604 being positioned in a location corresponding to a location at which a textual representation of the word "PERSPECTIVE" is projected. So in response to determining that the cylindrical block 604 is positioned in a location corresponding to a location at which a textual representation of the word "PERSPECTIVE" is projected, the control system 310 may initiate the perspective operating mode and may direct the example projection system 404A to emit a projection 802 illustrative of a 3D shape of the desired physical object in accordance with a vantage point of the user 412.

After the perspective mode is initiated, the control system 310 may responsively direct the projection system 304 to emit a textual representation corresponding to the editing operating mode (e.g. instead of or in addition to emitting the textual representation corresponding to the perspective operating mode), such as a textual representation of the word "EDIT" as shown in FIG. 8B. As such, the control system 310 may be arranged to switch from the perspective mode to the editing mode upon placement of the particular physical item at a location associated with the editing mode, such as at a location where the projection of the word "EDIT" is emitted.

Similarly, after the editing mode is initiated (as further discussed below), the control system 310 may responsively direct the projection system 304 to emit a textual representation corresponding to the perspective operating mode (e.g. instead of or in addition to emitting the textual representation corresponding to the editing operating mode), such as a textual representation of the word "PERSPECTIVE" as shown in FIG. 8A. As such, the control system 310 may be arranged to switch from the editing mode to the perspective mode upon placement of the particular physical item at a location associated with the perspective mode, such as at a location where the projection of the word "PERSPECTIVE" is emitted.

In this manner, the control system 310 may be configured to switch between the perspective and editing modes, thereby allowing a user to visualize the 3D shape of the desired object before and/or after adjustments to the 3D are carried out during editing mode as further described below. For example, the control system 310 may detect that the particular physical item is at a location corresponding to a location associated with the perspective mode and may responsively initiate the perspective mode and direct the projection system 304 to emit onto the substrate 306A a projection illustrated of the 3D shape of the desired object. Then, the control system 310 may detect that the particular physical item is at a location corresponding to a location associated with the editing mode and may responsively initiate the editing mode. While operating in the editing mode, the control system 310 may receive input data indicative of adjustments to the 3D shape. And then, the control system 310 may once again detect that the particular physical item is at a location corresponding to a location associated with the perspective mode and may responsively again initiate the perspective mode. In this case, however, the control system 310 may direct the projection system 304 to emit onto the substrate 306A a projection illustrated of the adjusted 3D shape of the desired object. Other examples are possible as well.

B. Editing Mode

In an example implementation, the control system 310 may be configured to operate in accordance with an editing mode. In particular, the editing mode is a mode during which the control system 310 is configured to receive input data indicative of one or more adjustments to the 3D shape of the physical object and thus a mode during which the control system 310 may carry out adjustments to the 3D shape (e.g., to the model data) in accordance with the input data. Additionally, during the editing mode, the control system 310 may be configured to direct the projection system 304 to emit onto the substrate 306A editing mode projections that illustrate the 3D shape as being adjustable. For instance, the editing mode projections may include a 2D outline illustrating an outline of a subsection of the 3D shape. As further discussed below, a user may adjust that 2D outline so as to ultimately adjust the 3D shape. And in this regard, an outline for any feasible subsection of the 3D shape may be projected so that the 3D shape is adjustable along any 3D direction (e.g., along height, width, and/or length of the 3D shape).

Further, the control system 310 may be configured to detect that the particular physical item is positioned within the environment 300 in a particular location that is associated with the editing mode and may responsively initiate the editing mode and perhaps also direct the projection system 304 to emit the above-mentioned editing mode projections. For instance, this particular location may correspond to (e.g., be within a threshold distance of) a location at which the "EDIT" menu option is projected and/or may be another location within the environment 300. Moreover, once the editing mode is initiated, the control system 310 may then be configured to carry out one or more editing mode procedures, which may include adjustments to the 3D shape in accordance with input data, among other possibilities.

By way of example, FIG. 8B illustrates the cylindrical block 604 being positioned in a location corresponding to a location at which a textual representation of the word "EDIT" is projected. So in response to determining that the cylindrical block 604 is positioned in a location corresponding to a location at which a textual representation of the word "EDIT" is projected, the control system 310 may initiate the editing mode and may direct the projection system 404A to emit a projection 804 illustrative of a 2D outline of a subsection of the desired surfboard. Other examples are also possible.

Figure 9:
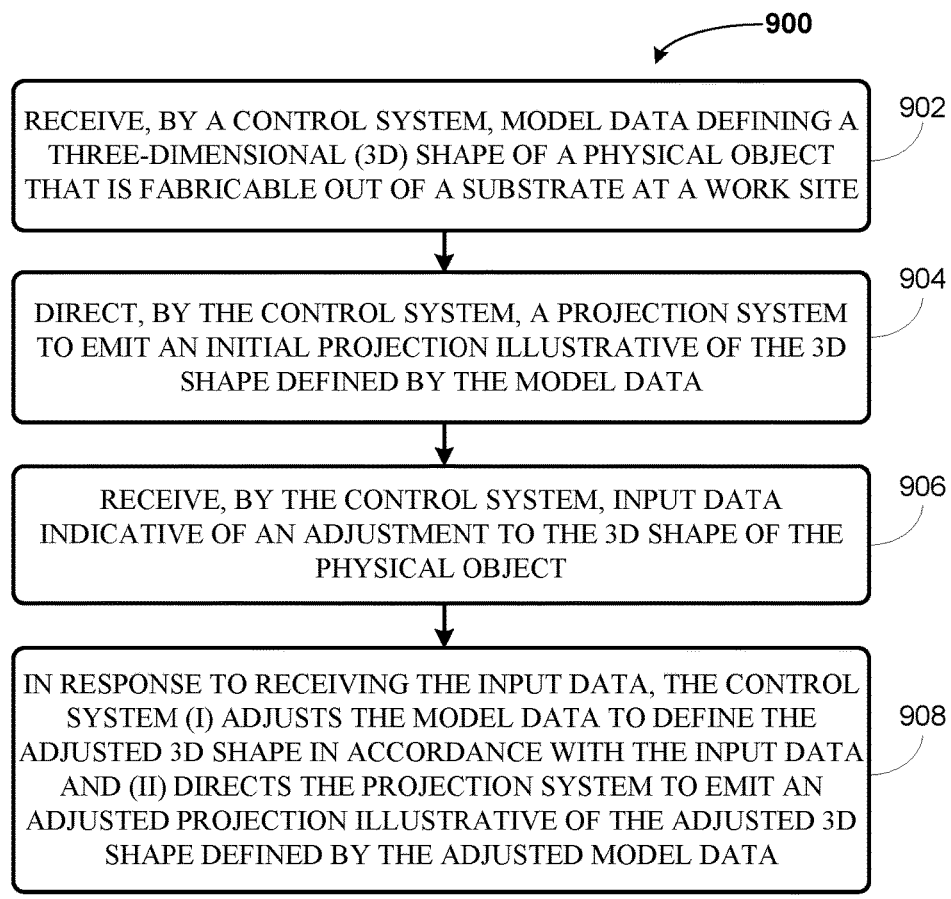
FIG. 9 is an example flowchart for adjusting a 3D shape of an object based on input data, according to an example implementation.

Given the above-described arrangements, the control system 310 may be configured to carry out adjustments to the 3D shape in various ways. To illustrate, consider FIG. 9 showing an example method for adjusting the 3D shape based on input data. In particular, FIG. 9 is a flowchart illustrating a method 900, according to an example implementation.

As shown by block 902, method 900 involves receiving, by a control system, model data defining a 3D shape of a physical object that is fabricable out of a substrate located within a work site. As discussed in detail above, the control system 310 may receive model data and/or other data that provides information related to design (and/or fabrication) of an object. This model data may be received via an interface (e.g., GUI) through which a user can provide such information and/or determined based on sensor data, among other possibilities.

Figure 10:
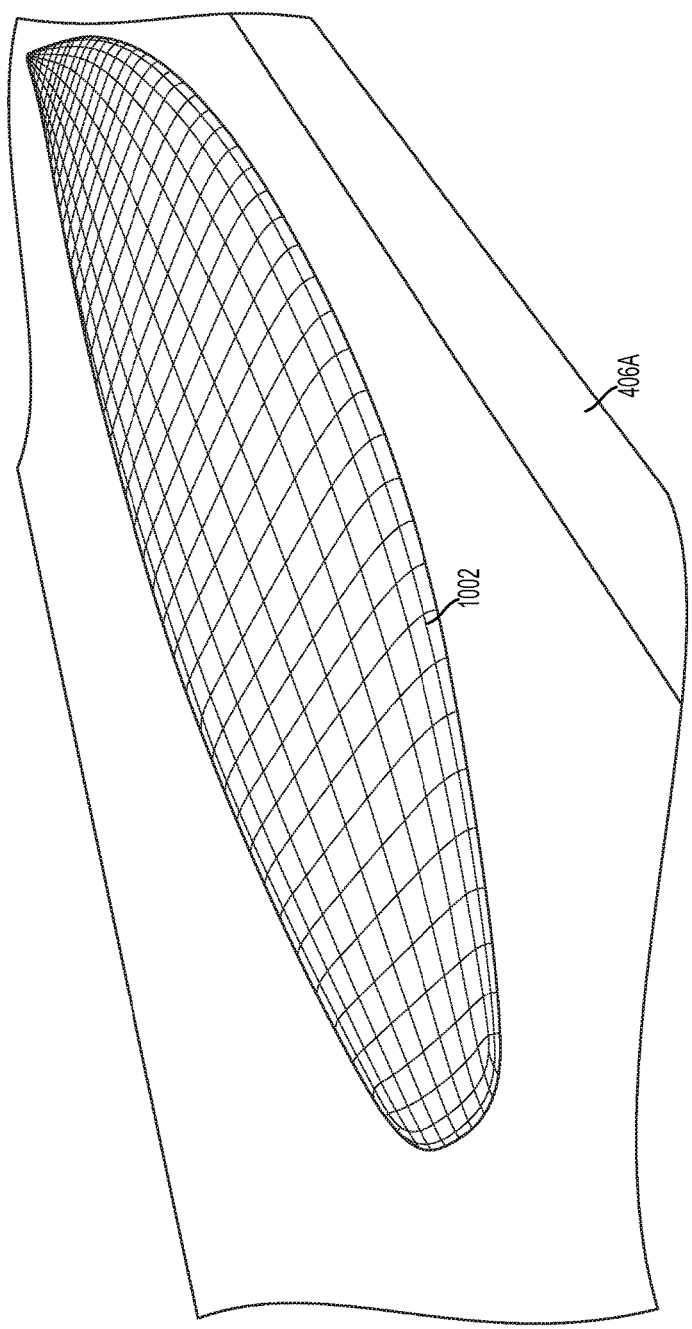
FIG. 10 illustrates a perspective projection of a 3D shape of an object, according to an example implementation.

As shown by block 904, method 900 involves directing, by the control system, a projection system to emit (e.g. onto the design piece 306B) an initial projection illustrative of the 3D shape defined by the model data. In particular, this initial projection at issue may be a projection emitted during the perspective mode. By way of example, FIG. 10 shows a projection 1002 illustrative of the 3D shape of the object in accordance with the vantage point of the user 412. Alternatively, this initial projection at issue may be a projection emitted during the editing mode. By way of example, the initial projection may be illustrative of the 3D shape by including a 2D outline representative of a subsection of the 3D shape. In either case, this initial projection may be emitted before any previous adjustments are carried or before any further adjustments are carried out (e.g., in a situation when some adjustments have been previously carried out yet the user still seeks to carry out further adjustments). Other cases are also possible.

As shown by block 906, method 900 involves receiving, by the control system, input data indicative of an adjustment to the 3D shape of the physical object. And as shown by block 908, method 900 involves, in response to receiving the input data, the control system (i) adjusting the model data to define the adjusted 3D shape in accordance with the input data and (ii) directing the projection system to emit an adjusted projection illustrative of the adjusted 3D shape defined by the adjusted model data.

As noted above, the particular physical item may be used as an input mechanism and thus the control system 310 may receive input data based on detection of particular movements of the physical item and/or based on gestures carried out with or relative to the physical item, among other possibilities. As such, if the control system 310 is operating in accordance with the perspective mode, then the input data may initially involve switching to the editing mode in preparation for carrying out adjustments. And once the control system 310 is operating in accordance with the editing mode (or if the control system 310 has already been operating in accordance with the editing mode), then the input data may be representative of adjustments to the 3D shape.

More specifically, the control system 310 may be configured to detect within the environment 300 a particular movement of (and/or gesture with) the physical item and, based on the detected movement, to determine the particular adjustment to the 3D shape. In this regard, the control system 310 may detect the particular movement relative to the editing mode projections that illustrate the 3D shape as being adjustable. For instance, the control system 310 may determine the direction and/or extent (e.g., distance) of movement of the physical item relative to a 2D outline illustrating an outline of a subsection of the 3D shape. So based on the direction and/or extent of movement of the physical item, the control system 310 may receive input data indicative of adjustments to the outline in accordance with that direction and/or that extent. Once the input data is received, the control system 310 may respond to receiving the input data by adjusting the model data to define the adjusted 3D shape in accordance with the input data.

In a more specific example, the physical item may move a certain extent towards a center of the 2D outline (e.g., a center of a circular outline) and do so in the vicinity of a certain portion of the 2D outline, thereby indicating that this portion of the subsection of the 3D shape should be moved inwardly by that extent (e.g., inwardly adjusting a curvature of that portion of the subsection and thus narrowing that subsection of the 3D shape). And in yet another example, the physical item may move a certain extent away from the center of the 2D outline and do so in the vicinity of a different portion of the 2D outline, thereby indicating that this different portion of the subsection of the 3D should be moved outwardly by that extent (e.g., outwardly adjusting a curvature of that different portion of the subsection and thus expanding that subsection of the 3D shape). Other examples are also possible.

Furthermore, the control system 310 may also use the input data as basis for adjusting various aspects of the above-mentioned editing mode projections. More specifically, the control system 310 may use the input data as basis for directing the projection system 304 to emit onto the substrate 306A a series of projections that collectively illustrate the adjustment the 3D shape into an adjusted 3D shape. Moreover, the control system 310 may direct the projection system 304 to emit this series of projections as the input data is being received, such as substantially during a particular movement of the physical item for instance. As an example, each projection in this series may be a projection of an adjusted 2D outline of a subsection of the 3D shape. As such, a certain projection in this series may illustrate a certain adjusted 2D outline of the subsection and a subsequent projection in this series may illustrate a subsequently adjusted 2D outline of the same subsection. In this manner, the series of projections may help a user visualize how the 3D shape of the physical object is being adjusted and do so while the user is adjusting the 3D shape. Other examples are also possible.

In some cases, the control system 310 may be configured to direct the projection system 304 to emit editing tool projections, which may illustrate one or more tools for adjusting the 3D shape. For example, the editing tool projections may be illustrative of a line that is tangent to the 2D outline projection, such as by intersecting at least one point on the 2D outline. In practice, that line may be visually moveable about the intersecting point based on movement of the physical item and those movements of the line may visually adjust curvature of one or more segments of the 2D outline adjacent to that intersecting point. Other examples are also possible.

As such, the control system 310 may detect that the particular item is positioned on the substrate 306A in a particular location that substantially corresponds to a location of an editing tool projection (e.g., on a point of the tangent line projection other than the intersecting point) and may responsively initiate an editing mode procedure. In particular, that editing mode procedure may define a procedure during which detection of subsequent movement of the physical item is to be used as basis for determining the adjustment to the 3D shape. And once the control system 310 detects subsequent movement of the physical item from a first location to a second location, the control system 310 may direct the projection system 304 to emit a series of editing tool projections on respective locations on the substrate 306A that substantially correspond to locations of the physical item throughout those subsequent movements from the first location to the second location. For instance, the physical item may be positioned on a particular point of the tangent line projection and then subsequent movement of the physical item may result in projections of that point to visually follow the physical item and may also visually cause the remaining segment of the tangent line to visually move (e.g., rotate) about the above-mentioned intersecting point. And as the tangent line visually moves, the curvature of the 2D outline may visually change in accordance with the adjustment. In this manner, these various projections may assist a user with adjusting the 3D shape.

Figure 11A:
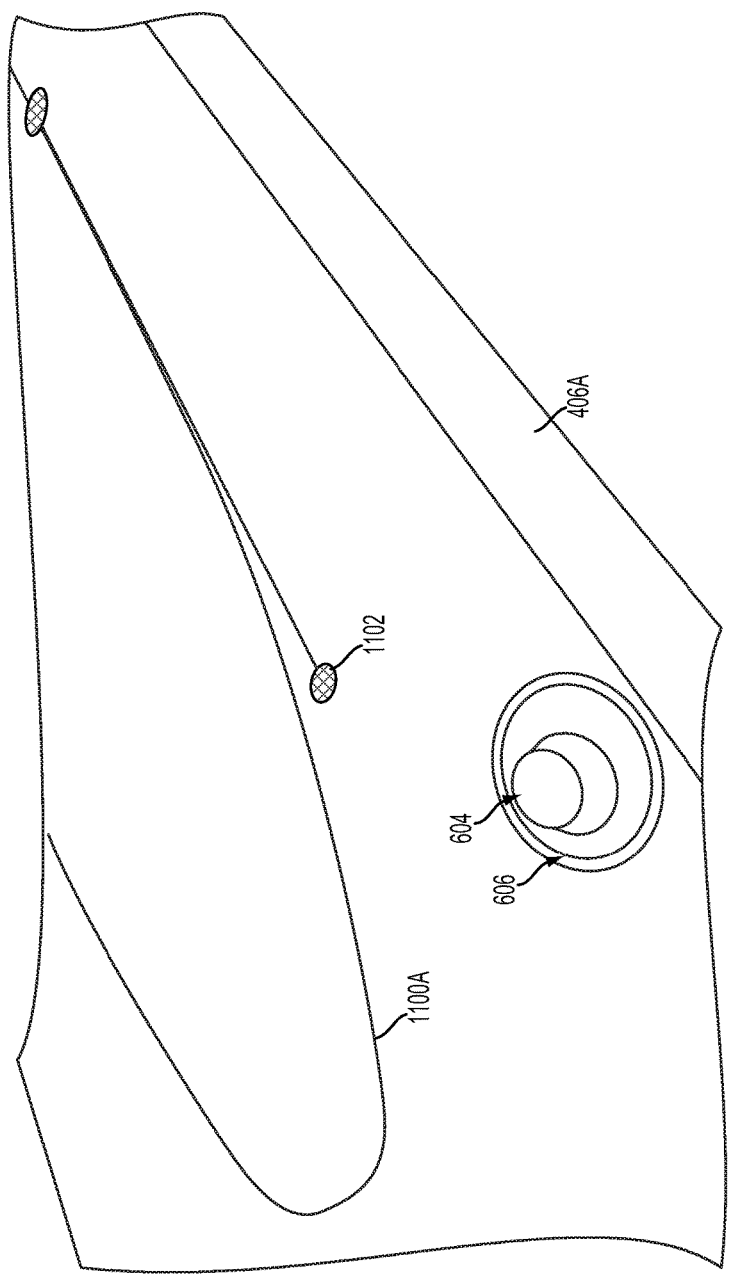
FIGS. 11A to 11D illustrate an adjustment of the 3D shape of the object, according to an example implementation.

FIGS. 11A to 11D collectively illustrate an example adjustment of the 3D shape during the editing mode. As shown in FIG. 11A, the control system 310 may direct the projection system 404A to emit a projection 1100A illustrative of a 2D outline of a subsection of the desired surfboard. Additionally, the control system 310 may direct the projection system 404A to emit an editing tool projection 1102 taking the form of the tangent line describe above.

Figure 11B:
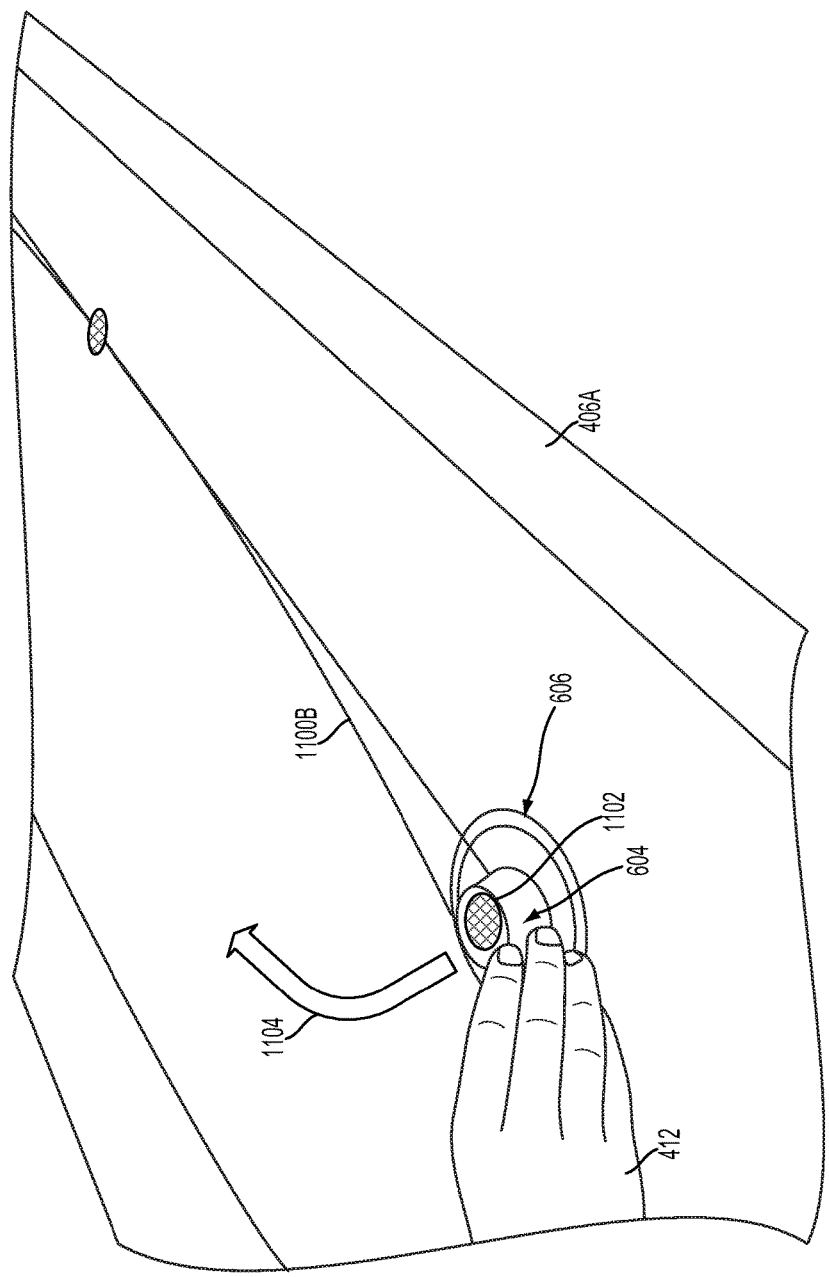

Further, as shown in FIG. 11B, the control system 310 may direct the projection system 404A to emit a projection 1100B that is illustrative of the same 2D outline as in projection 1100A but at a later point in time. Additionally, FIG. 11B illustrates that the user 412 has placed the cylindrical block 604 in a location of the substrate 406A that substantially corresponds to a location of the editing tool projection 1102, such as by specifically placing the cylindrical block in a location of a dot projection that is part of the projected tangent line. Once the control system 310 detects that the cylindrical block 604 is placed at that location, the control system 310 may initiate the above-described editing mode procedure. And as further shown in FIG. 11B, the user 412 plans to carry out a particular movement 1104 of the cylindrical block 604 so as to adjust the 3D shape of the surfboard.

Figure 11C:
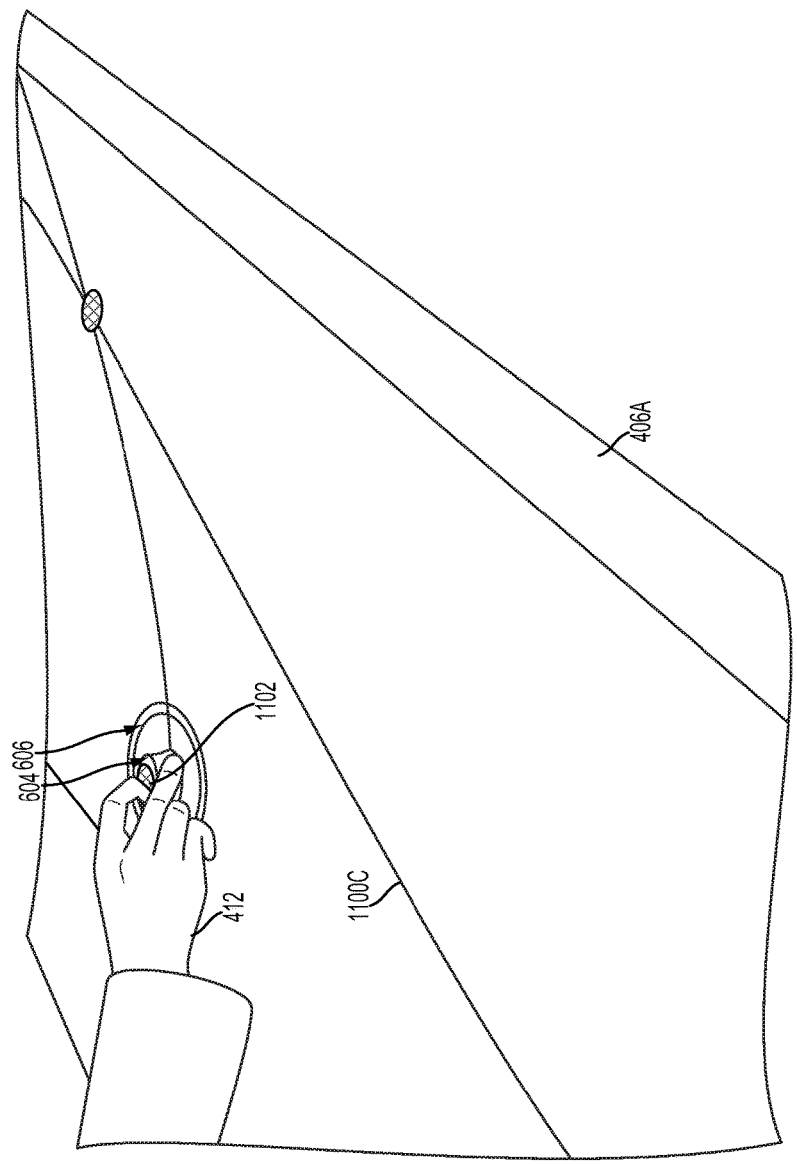

Yet further, as shown in FIG. 11C, the user 412 is in the process of moving the cylindrical block 604 according to the particular movement 1104. As shown, the above-mentioned dot projection (i.e., of the editing tool projection 1102) moves from one location to another in accordance with movement of the cylindrical block 604. Also, the remaining segment of the tangent line (i.e., of the editing tool projection 1102) visually rotates about a point that intersects the projection 1100C of the 2D outline. And in this regard, the projection 1100C illustrates that the curvature of the 2D outline has changed in accordance with the adjustment of the 3D shape of the surfboard.

Figure 11D:
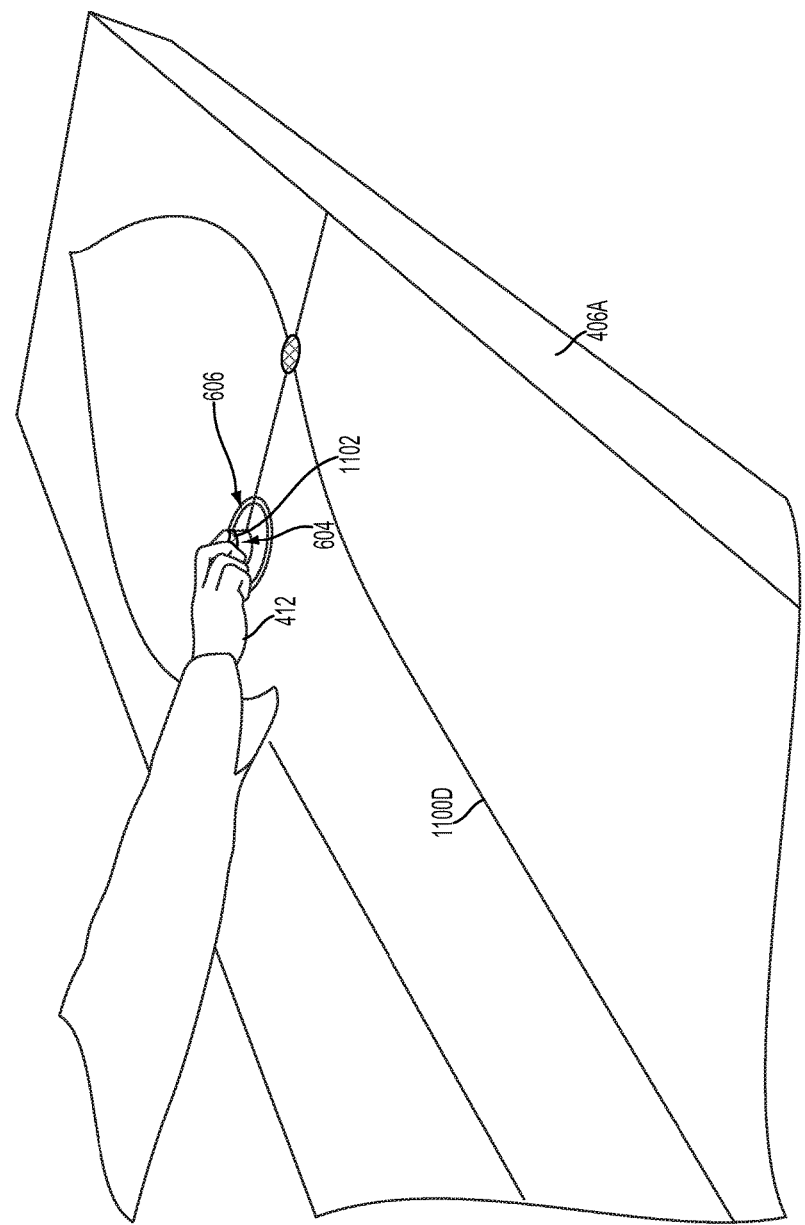

Yet further, as shown in FIG. 11D, the user 412 further moved the cylindrical block 604 according to the particular movement 1104 and has finished the adjustment. As shown, the above-mentioned dot projection and above-mentioned the remaining segment of the tangent line further visibly moved in the manner described above. And in this regard, the projection 1100D illustrates that the curvature of the 2D outline has further changed in accordance with the adjustment of the 3D shape of the surfboard. Other illustrations are also possible.

Once the adjustment has been completed, the control system 310 may detect a particular gesture or the like relative to the physical item and may responsively stop the editing mode procedure. For instance, this gesture may involve the user covering the physical item such that the physical item is not detectable by the control system 310 for a threshold time period. As such, once the editing mode procedure has stopped, any subsequent movement of the physical item may no longer result in adjustments to the shape. In this manner, the user may start, carry out, and then stop the editing mode procedure using various gestures and/or movements of the physical item.

As noted above, the control system 310 may respond to receiving the input data indicative of the adjustment by (i) adjusting the model data to define the adjusted 3D shape in accordance with the input data and (ii) directing the projection system 304 to emit an adjusted projection illustrative of the adjusted 3D shape defined by the adjusted model data. In particular, this adjusted projection at issue may be a projection emitted during the perspective mode. Moreover, the adjusted model data also could be determined by using one or more sensors (e.g., depth camera) to from time-to-time (e.g., continuously or periodically) rescan the surface of the substrate 306A and based on each such scan determine the adjusted model data.

Figure 12:
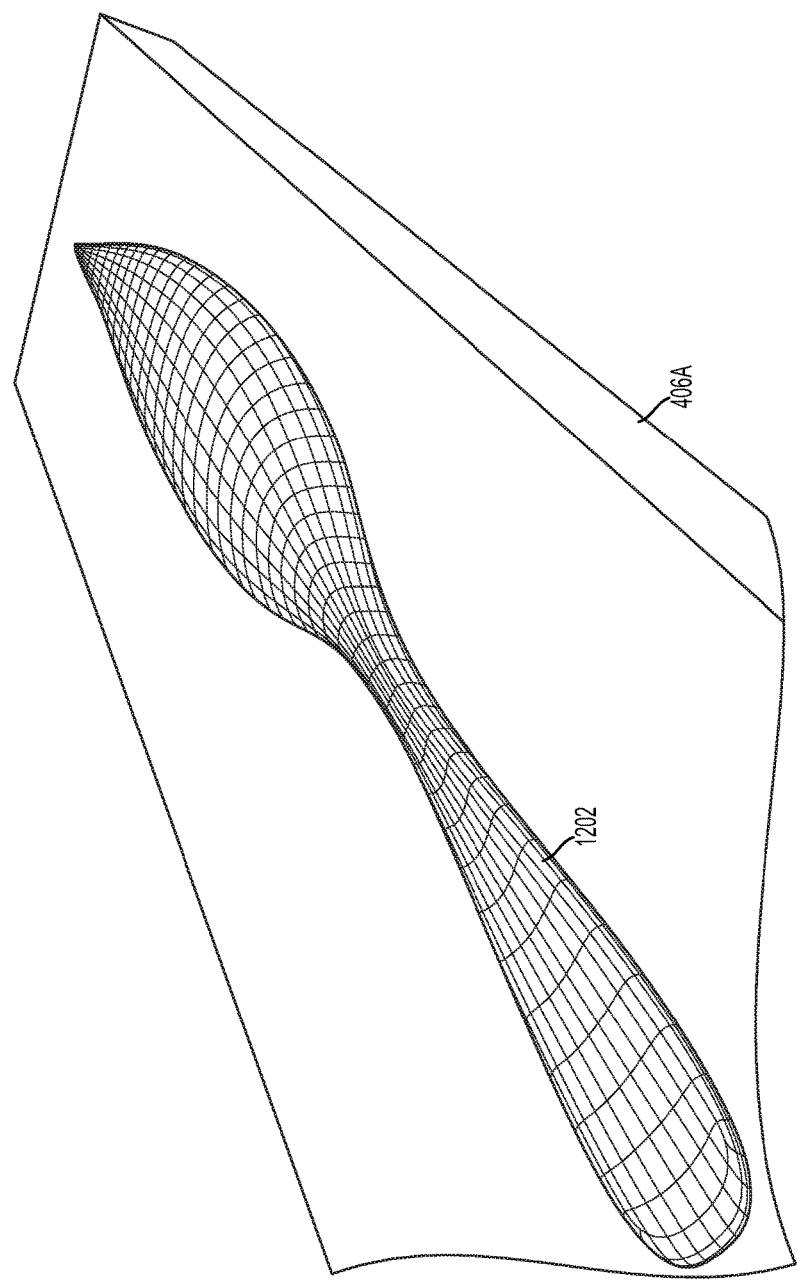
FIG. 12 illustrates a perspective projection of an adjusted 3D shape of the object, according to an example implementation.

By way of example, FIG. 12 shows a projection 1202 illustrative of the adjusted 3D shape of the object in accordance with the vantage point of the user 412. Alternatively, this adjusted projection at issue may be a projection emitted during the editing mode. By way of example, the adjusted projection may be illustrative of the 3D shape by including a 2D outline representative of a subsection of the 3D shape, such as the projection 1100D shown in FIG. 11D. In either case, this adjusted projection may be emitted after input data is received and perhaps after adjustments are carried out. Other cases are also possible.

C. Reset Mode

In an example implementation, the control system 310 may be configured to operate in accordance with a reset mode. In particular, the reset mode is a mode during which the control system 310 may be configured to reset the model data to again define a 3D shape that was already previously defined by the model data before an adjustment of the model data was carried out in accordance with input data. Moreover, during the reset mode, the control system 310 may be configured to direct the projection system 304 to emit onto the substrate 306A a reset projection illustrative of the 3D shape previously defined before the adjustment.

Further, the control system 310 may be configured to detect that the particular physical item is position within the environment in a particular location that is associated with the reset mode and may responsively initiate the reset mode. For instance, this particular location may correspond to (e.g., be within a threshold distance of) a location at which the "RESET" menu option is projected and/or may be another location within the environment 300. Moreover, as noted, once the reset mode is initiated, the control system 310 may then reset the model data and direct the projection system 304 to emit the reset projection.

As an example of this implementation, the user 412 may have adjusted the 3D shape to the 3D shape illustrated by the projection 1202 shown in FIG. 12. After the user 412 has adjusted the 3D shape in this manner, the user 412 may decide to reset the 3D shape back to the 3D shape illustrated by the projection 1002 shown in FIG. 10. To do so, the user 412 may place the cylindrical block 304 in a location corresponding to a location at which a textual representation of the word "RESET" is projected (e.g., such as the textual representation shown in FIGS. 8A and 8B). So in response to determining that the cylindrical block 604 is positioned in a location corresponding to a location at which a textual representation of the word "RESET" is projected, the control system 310 may reset the model data to again define the 3D shape illustrated by the projection 1002 and may also direct the projection system 404A to again emit the projection 1002 onto the substrate 406A. Other examples are also possible.

D. Rescan Mode

In an example implementation, the control system 310 may be configured to operate in accordance with a rescan mode (not shown in the Figures). In particular, the rescan mode is a mode during which the control system 310 may be configured to update the model data based on most recently received sensor data. Moreover, during the rescan mode, the control system 310 may be configured to direct the projection system 304 to emit onto the substrate 306A a rescan projection illustrative of the 3D shape in accordance with the updated model data.

In practice, updating the model data based on most recently received sensor data may take various forms. For example, a location of the substrate 306A may change, an orientation of the substrate 306A may change, and/or the physical shape of the substrate 306 may change (e.g., due to fabrication), among other possibilities. As such, the control system 310 may use the most recently received set of sensor data to detect one or more such changes and to update the model data based on such changes. For instance, the model data may be updated so that the 3D shape fits within a changed shape of the substrate 306A, so that the 3D shape corresponds to a changed orientation of the substrate 306A, and/or so that the 3D shape corresponds to a changes location of the substrate 306A, among others.

Further, the control system 310 may be configured to detect that the particular physical item is positioned within the environment in a particular location that is associated with the rescan mode and may responsively initiate the rescan mode. For instance, this particular location may correspond to (e.g., be within a threshold distance of) a location at which the "RESCAN" menu option is projected and/or may be another location within the environment 300. Moreover, as noted, once the reset mode is initiated, the control system 310 may then update the model data and direct the projection system 304 to emit the rescan projection.

IV. Interactive Object Fabrication

Figure 13:
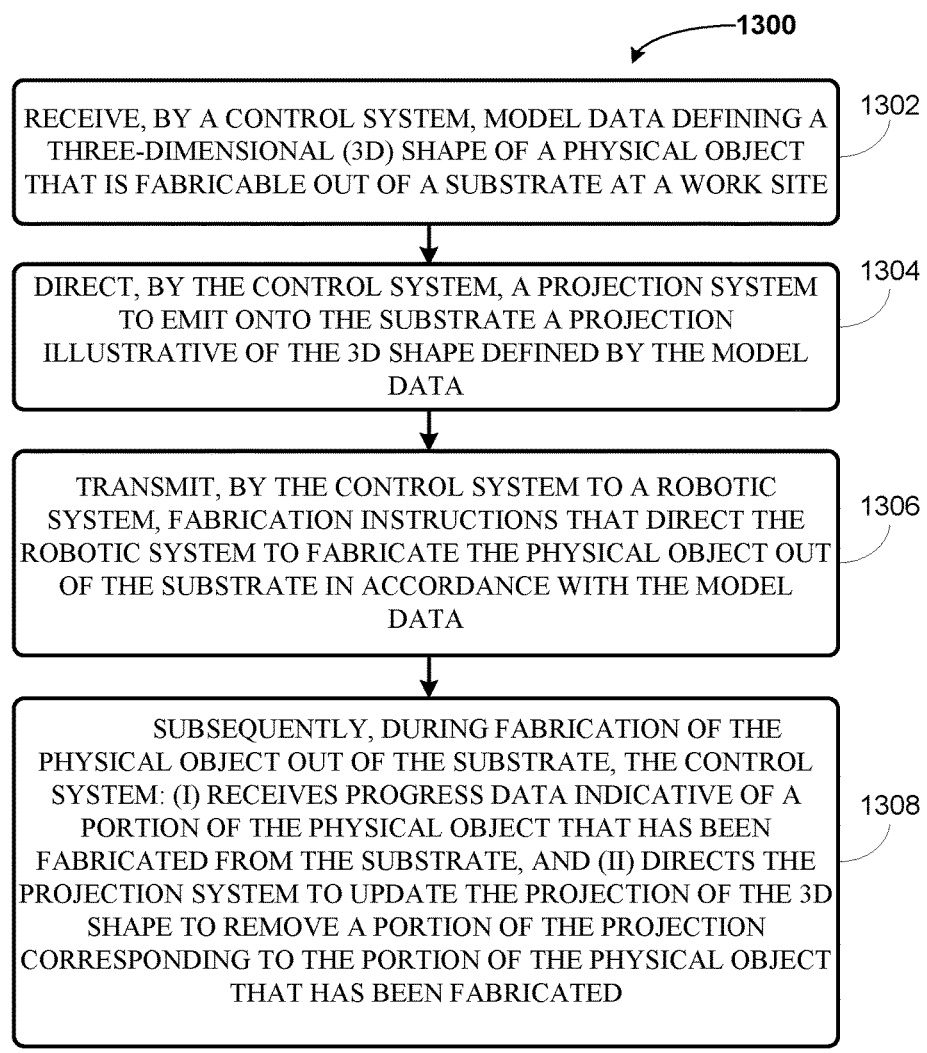
FIG. 13 is an example flowchart for updating projections based on fabrication progress, according to an example implementation.

In an example implementation, the control system 310 may be configured to direct the projection system 304 to update projections during fabrication of the physical object. To illustrate, consider FIG. 13 showing an example method for updating projections based on fabrication progress. In particular, FIG. 13 is a flowchart illustrating a method 1300, according to an example implementation.

As shown by block 1302, method 1300 involves receiving, by a control system, model data defining a three-dimensional (3D) shape of a physical object that is fabricable out of a substrate at a work site.

As discussed in detail above, the control system 310 may receive model data and/or other data that provides information related to design (and/or fabrication) of an object. This model data may be received via an interface (e.g., GUI) through which a user can provide such information and/or determined based on sensor data, among other possibilities. Moreover, the model data could be adjusted as described above before fabrication of the physical object begins. And as further discussed below, the model data could be adjusted during fabrication of the physical object.

As shown by block 1304, method 1300 involves directing, by the control system, a projection system to emit onto the substrate a projection illustrative of the 3D shape defined by the model data.

Once model data has been received and perhaps also adjusted as described above in the context of the design environment, the control system 310 may have model data representative of the desired 3D shape of the object and may then direct a projection system 304 to emit at least one projection within the work site in preparation for and/or during fabrication of the physical object. In particular, this projection may illustrate the 3D shape of the desired physical object and could do so in various ways as described above. For instance, this projection at issue may be a projection emitted during the perspective mode. Alternatively, this projection at issue may be a projection emitted during the editing mode. Other types of projections are also possible.

In practice, the control system 310 may direct the projection system 304 to emit this projection onto the substrate 306A itself, which (as described above) could be the same physical piece as the design piece 306B or could be physically separate from the design piece 306B. Moreover, the control system 310 may direct the projection system 304 to emit this projection onto a particular location on the substrate. For instance, this particular location may be a location that corresponds to a location on the design piece 306B onto which a projection was or is being emitted. As an example, during design of the 3D shape of the object in the design environment, a user may have adjusted a projection such that the projection is emitted onto a center location on the design piece 306B representative of the substrate 306A. As a result, the control system 310 may direct the projection system 304 to emit the projection at issue onto a center location of the substrate 306A. In some situations, the control system 310 may also receive input data (e.g., via a GUI or by detecting movement of a physical item) indicative of another location on the substrate 306A onto which to emit the projection and the control system 310 may responsively direct the projection system 304 to emit the projection at issue onto that other location of the substrate 306A. Other examples and situations are also possible.

FIG. 14A illustrates an example of such a projection that could be emitted in preparation for and/or during fabrication of the object. In particular, FIG. 14A shows an example work site 1400 that includes a wall 1404. In practice, the wall 1404 could be considered to be the substrate out of which the physical object is to be fabricated. For instance, a user may seek to have a 3D ellipsoid shape carved into the wall 1404 (e.g., creating an indentation on the wall taking the form of half of a 3D ellipsoid shape). Hence, as shown, a projection 1402A is projected onto the wall 1404 and that projection 1402A is substantially illustrative of a 3D ellipsoid. Other examples are also possible.

As shown by block 1306, method 1300 involves transmitting, by the control system to a robotic system, fabrication instructions that direct the robotic system to fabricate the physical.

As noted, the control system 310 may be in communication with the robotic system 100. In this way, the control system 310 may transmit instructions to the robotic system 100 so as to direct the robotic system 100 to fabricate the physical object out of the substrate 306A in accordance with model data defining the 3D shape of the desired object. These instructions may specify a tool to be used, a portion of a substrate to be removed, an extent of the portion that should be removed, a shape in accordance with which the portion should be removed, and/or an order of fabrication, among any other feasible instructions.

Moreover, the fabrication instructions may direct the robotic system to fabricate the physical object out of the substrate 306A at certain fabrication points on the substrate 306A. In particular, these fabrication points may be one or more point on the substrate 306A at which the robotic system 100 is to carry out fabrication actions using one or more tools, such as by carrying out a certain cut or a certain etch at a certain point on the substrate 306A. Furthermore, these fabrication points may be determined based on the projection illustrative of the 3D shape of the desired physical object.

More specifically, the fabrication points may substantially correspond to the particular location on the substrate onto which the projection is emitted. So in this regard, the control system 310 may use sensor data (e.g., image, position, and/or projection data) to determine the particular location and may then direct the robotic system 100 to fabricate at fabrication points that correspond to the particular location. By way of example, FIG. 14A shows that the projection 1402A is projected onto a certain location on the wall 1404 and thus the control system 310 may direct a robotic system to fabricate the illustrated shape at that same location on the wall 1404. Other examples are also possible.

As shown by block 1308, method 1300 involves subsequently, during fabrication of the physical object out of the substrate, the control system: (i) receiving progress data indicative of a portion of the physical object that has been fabricated from the substrate, and (ii) directing the projection system to update the projection of the 3D shape to remove a portion of the projection corresponding to the portion of the physical object that has been fabricated.

As noted, the control system 310 may receive from the robotic system 100 data specifying fabrication progress and/or the control system 310 may use received sensor data (e.g., rescanning of the substrate) as basis to determine fabrication progress and/or as basis for adjusting the 3D model. In either case, such progress data may specify various forms of information. In particular, the progress data may specify a tool being used to fabricate, a portion of a substrate that is being removed or that has been removed, an extent to which the portion has been removed, a next portion of the substrate that is to be removed, fabrication points at which fabrication actions are being carried out, the specific fabrication actions being carried out (e.g., cutting or etching), a spatial position of the robotic system, a configuration of the robotic system, and/or an operating mode of the robotic system, among others.

Once the control system 310 receives progress data and thus has information specifying progress of fabricating the desired object, the control system 310 may then use that progress data as basis for updating the projection being emitted. In particular, the control system 310 may direct the projection system 304 to update the projection of the 3D shape to remove a portion of the projection corresponding to a portion of the physical object that has been fabricated. In this way, the visual removal of a certain portion of the projection illustrates fabrication progress while the remaining portion of the projection illustrates a portion of the desired physical object that has yet to be fabricated.

In practice, the control system 310 may use one of various approaches to update the projection. For instance, the control system 310 may have information specifying the above-described fabrication points and, as progress data is received, the control system 310 may store indications indicating at which fabrication points the act of fabrication has already occurred and thus which portions of the physical object have already been fabricated from the substrate. With this arrangement, the control system 310 could (e.g., from time-to-time) update a 3D model of the desired physical object (e.g., update model data) by removing from the 3D model corresponding portions of the physical object that have already been fabricated. Once the 3D model is updated, the control system 310 may use 3D rendering techniques as described above to convert the updated 3D model into a 2D image having a 3D effect representative of the 3D shape of the remaining portion. And the control system 310 may then direct the projection system 304 to emit an updated projection illustrative of that 2D image, thereby providing a 3D effect to illustrate the 3D shape of the remaining portion of object that has yet to be fabricated.

Moreover, when updating the projection as described above, the control system 310 may also direct the projection system 304 to emit the update projection onto a particular location on the substrate 306A that corresponds to fabrication points at which the robotic system 100 is set to fabricate the remaining portion of the physical object. In particular, the control system 310 may have information specifying fabrication points on the substrate 306A, which may be based on the initial projection as described above. Also, as noted, the control system 310 may store indications indicating at which fabrication points the act of fabrication has already occurred, thereby also indicating at which fabrication points the act of fabrication has not yet occurred. As a result, the control system 310 may use sensor data (e.g., image, position, and/or projection data) to determine at least one particular location on the substrate 306A that substantially corresponds to fabrication points at which fabrication has yet to take place and may then direct the projection system 304 to emit the updated projection onto that particular location on the substrate 306A. Other approaches are also possible.

Given these arrangements, the control system 310 may from time-to-time (e.g., continuously or periodically) update the projection so as to illustrate fabrication progress and thus also the remaining portion of the physical object that has yet to be fabricated. For instance, the control system 310 may receive progress data indicating that a first portion of the physical object has been fabricated from the substrate 306A and may direct the projection system 304 to update the projection of the 3D shape to remove a first portion of the projection corresponding to the first fabricated portion. Then, the control system 310 may receive further progress data indicative of a second portion of the physical object that has been fabricated from the substrate 306A. And the control system 310 may direct the projection system 304 to further update the projection of the 3D shape to remove a second portion of the projection corresponding to the second fabricated portion. In this way, the further updated projection may illustrate that the first and second portions at issue have already been fabricated and may thus illustrate a remaining portion of the physical object that has yet be fabricated. Other instances are also possible.

Figure 14B:
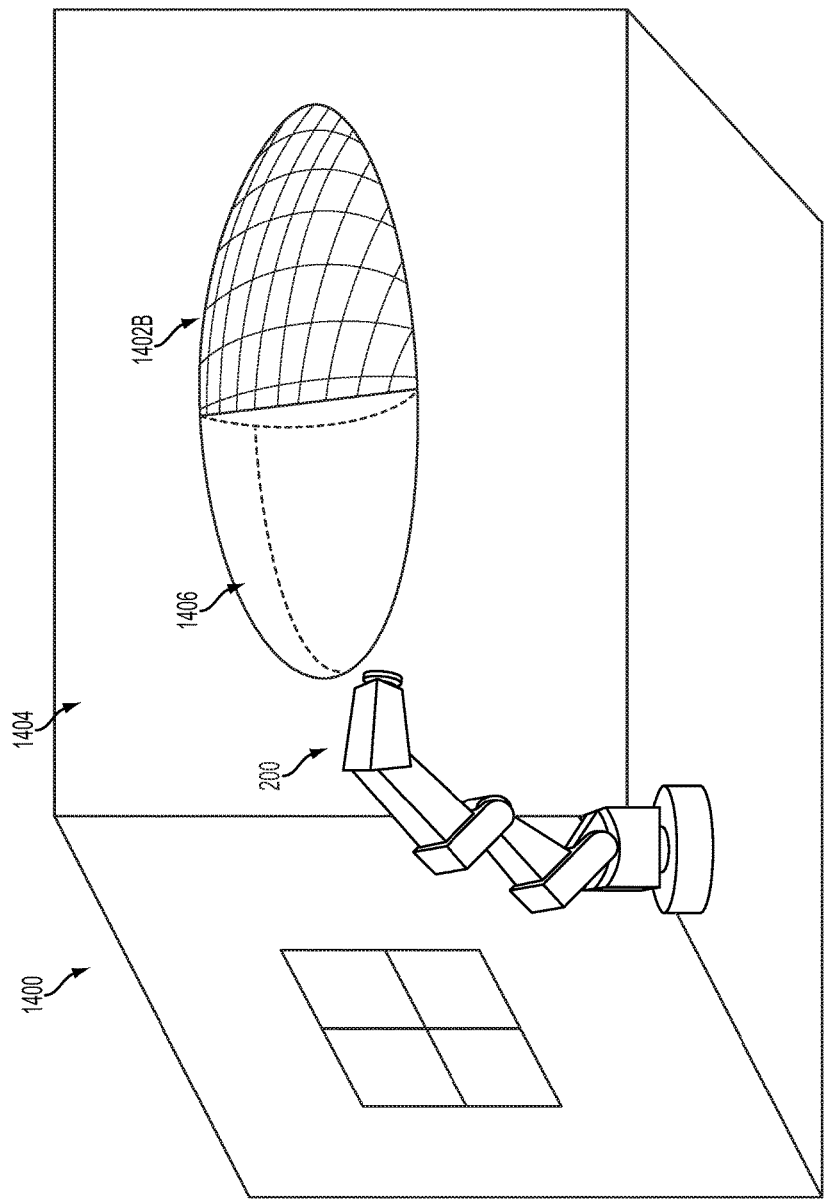

FIG. 14B next illustrates an example of a projection that has been updated based on fabrication progress. As shown, the robot arm 200 has carved into the wall 1404 a certain portion 1406 of the desired 3D ellipsoid shape. Thus, the control system 310 directs the projection system emit an update projection 1402B. And that updated projection 1402B is arranged to illustrate a remaining portion of the 3D ellipsoid shape that has not yet been fabricated by the robot arm 200. Other illustrations are also possible.

In a further aspect, the control system 310 may be configured to use input data as basis for adjusting a 3D shape of a remaining portion of the physical object that has yet to be fabricated. In practice, the control system 310 may receive this input data during fabrication of the physical object out of the substrate. Nonetheless, that input data could take various forms such as those discussed above. For instance, the control system 310 could detect within the work site a particular movement of the above-mentioned particular physical item. And the control system 310 could adjust the 3D shape of the remaining portion based on such a detected particular movement. Moreover, as discussed above, the control system 310 could direct the projection system 304 to emit a series of projections that collectively illustrate the adjustment.

In this aspect, once the control system 310 receives the input data, the control system 310 may responsively adjust the model data to define the adjusted 3D shape in accordance with the input data. In particular, the control system 310 may adjust parts of the model data that correspond to the remaining portion of the physical object that has not yet been fabricated. In doing so, the control system 310 may adjust those parts of the model data so that the model data is representative of the adjusted 3D shape. For example, if the particular movement of the particular physical item is indicative in a change in curvature of the remaining portion, then the model data is also adjusted so as to be representative of this change in curvature. Other examples are also possible.

Further, once the control system 310 receives such input data, the control system 310 may also responsively further update the projection and could do so during fabrication of the physical object. In particular, the control system 310 may direct the projection system 304 to further update the projection to illustrate the adjusted 3D shape of the remaining portion of the physical object as defined by the adjusted model data. The control system 310 may do so in various ways.

For instance, once the 3D model has been adjusted, that 3D model may also be updated to represent only the remaining portion of the 3D shape that has yet to be fabricated. So once the 3D model is updated and adjusted in this manner, the control system 310 may use 3D rendering techniques as described above to convert the adjusted and updated 3D model into a 2D image having a 3D effect representative of the adjusted 3D shape of the adjusted remaining portion. And the control system 310 may then direct the projection system 304 to emit a further updated projection illustrative of that 2D image, thereby providing a 3D effect to illustrate the adjusted 3D shape of the remaining portion of object that has yet to be fabricated. Other instances are possible as well.

Yet further, once the control system 310 receives such input data, the control system 310 may also responsively transmit to the robotic system 100 adjusted fabrication instructions that direct the robotic system 100 to fabricate the remaining portion of the physical object according to the adjusted model data defining the adjust 3D shape. In practice, the robotic system 100 may adjust the fabrication instructions in various ways. In one example, the control system 310 may determine that a different tool should be used for fabrication as a result of the adjustment to the 3D shape. Hence, the adjusted fabrication instructions may specify that different tool. In another example, the control system 310 may include the adjusted model data in the adjusted fabrication instructions, so that the robotic system 100 has information specifying the adjusted 3D shape in accordance with which to fabricate the remaining portion of the physical object. Other examples are also possible.

Moreover, the adjusted fabrication instructions may direct the robotic system to fabricate the physical object out of the substrate 306A at fabrication points that correspond to a particular location of the further updated projection at issue. In particular, the above-mentioned adjustments to the 3D shape of the remaining portion may serve as basis for the control system 310 to direct the projection system 304 to emit the further updated projection onto a particular location on the substrate in accordance with the adjustment. For example, if the adjustment involves a change in curvature of the remaining portion, then the further updated projection may be emitted with certain projection characteristics and onto a location the substrate 306A to help illustrate that adjustment. Given this further updated projection, subsequent fabrication points may substantially correspond to the particular location on the substrate onto which the further updated projection is emitted. So in this regard, the control system 310 may use sensor data to determine that particular location and may then direct the robotic system 100 to fabricate at fabrication points that correspond to that particular location. Other aspects are also possible.

Figure 14C:
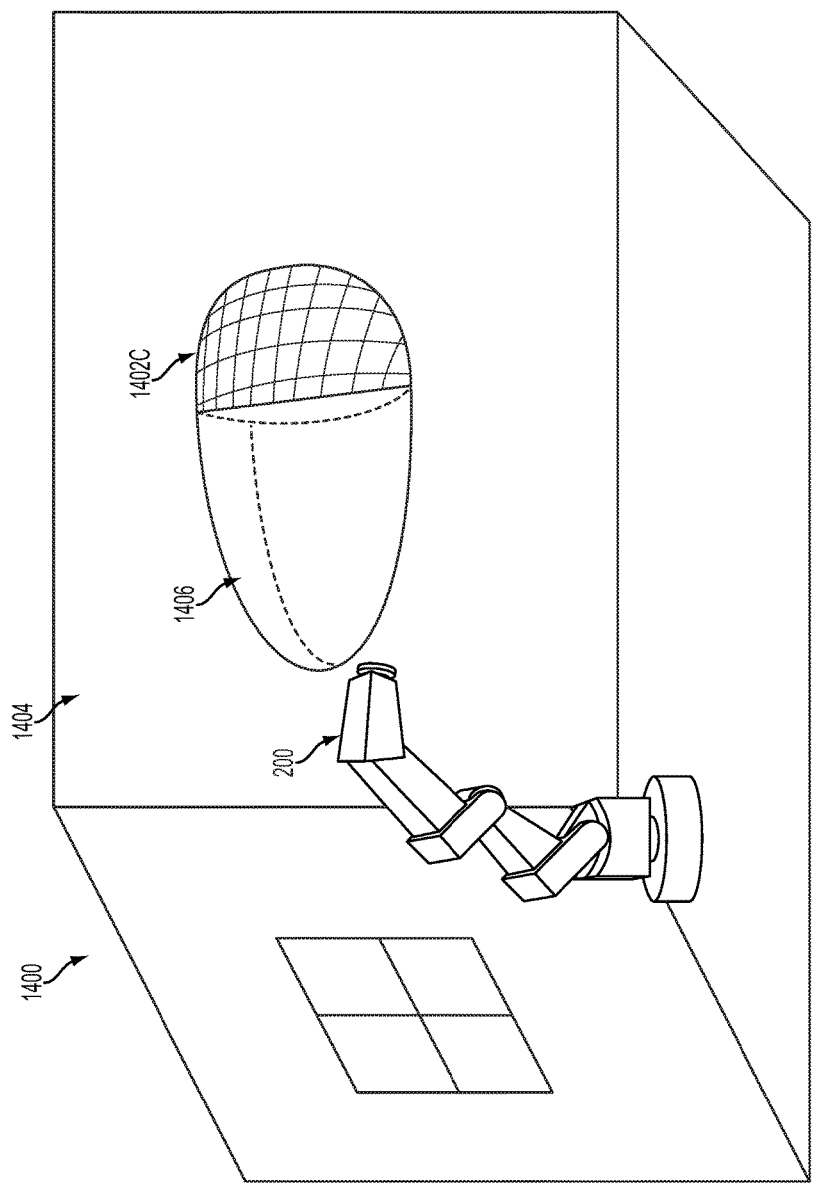
Figure 14D:
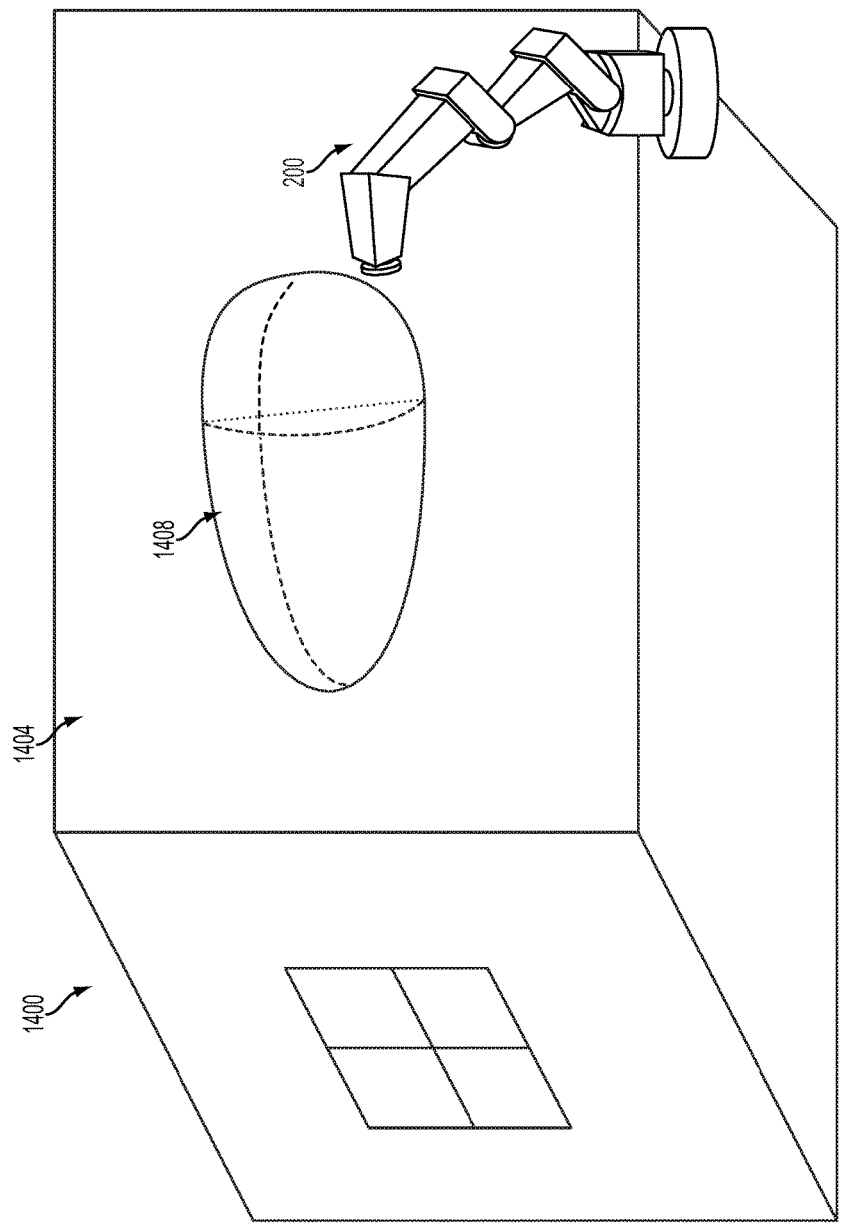

FIGS. 14C and 14D next illustrate an example adjustment to a remaining portion of an object undergoing fabrication as well as the object being completed according to that adjustment. In particular, FIG. 14C shows that the projection 1402B has been updated to projection 1402C, which illustrates that the remaining portion of the desired 3D ellipsoid shape has been adjusted. More specifically, the adjustment is illustrated as a change in the size and curvature of the remaining portion, so that the resulting desired shape to be carved into the wall 1404 is a 3D ovoid shape ("egg-shaped"). As such, FIG. 14D then shows that fabrication of the desired object is completed as the robot arm 200 carved the 3D ovoid shape 1408 into the wall 1404. Other illustrations are possible as well.

In a further aspect, any of the above-described implementations could also be carried out in the context of additive manufacturing. In particular, additive manufacturing may involve addition of one or more substrates (e.g., of the same material or of different materials) onto the substrate 306A at issue, such by layering (e.g., synthesizing) the additional substrates onto the substrate and/or by combining these substrates in other ways (e.g., gluing or drilling). As such, the robotic system 100 may also include tools used for additive manufacturing, such as a drill or 3D printing equipment or the like.

In this aspect, the control system 310 could also direct the projection system 304 to project projections related to portions (e.g., substrates) to be added (as compared to projections related to portions to be removed). For instance, such a projection may be projected onto a respective location on the substrate 306A where a certain portion is to be added to the substrate through additive manufacturing. Also, the projection may be illustrative of the 3D shape of the portion to be added. Additionally or alternatively, the projection may be illustrative of manufacturing aspects related to addition of the portion, such as by being illustrative of drill holes used for adding the portion for example. Moreover, such a projection is also adjustable (e.g., to adjust the overall the 3D shape) using the techniques described above and/or such a projection may also be updated according to changing vantage points as described above, among other features.

Nonetheless, once a portion is being added through additive manufacturing, the control system 310 may direct the projection system 304 to update the projection illustrative of that added portion, such as by removing at least some portions of that projection for instance. In particular, the projection may update so as to illustrate a remaining portion that has not yet been added while no longer illustrating a portion that has already been added. Other aspects are also possible.

V. Additional Features

In practice, the disclosed arrangement may provide for various additional features. While example additional features are described below, various other features are possible as well without departing from the scope of the present disclosure.

A. Templates

In an example implementation, the control system 310 may have stored thereon or may otherwise have access to information specifying one or more projectable templates. In particular, these templates may each be selectable based on received input (e.g., provided via GUI by a user). Once a template is selected, the control system 310 may direct the projection system to project a 2D and/or 3D projection representative of the template, such instead of or in addition to any of the other projections described herein. In practice, the templates could take various forms and could be used for various purposes so as to assist a user of the system. Moreover, each template may be configurable based on input, such as input via the GUI and/or using gestures so as to adjust the template projection.

For example, the user 412 may interact with computing system 410A so as to select a particular template via a GUI being displayed on a display of the computing system 410A. In practice, the particular template may be a hole pattern that could be used for the purpose of projecting points onto a substrate at locations corresponding to locations at which the user 412 and/or the robotic system are to drill holes using a drill for instance. Furthermore, the user 412 may configure various features of the particular template via the GUI. For instance, the user 412 may select a particular shape for the pattern, such as between a circular shape (e.g., for a 2D projection) and a spherical shape (e.g., for a 3D projection), among others.

Once the the particular template is selected, the projection system may then be directed to project onto the substrate a projection representative of the particular template. For example, the projection may be of a circular hole pattern at a selected location on the substrate. Once projected, the circular hole pattern template projection may then be further adjustable by using one or more gestures. For instance, the control system 310 may detect gestures corresponding to a selection of a number of holes to be included in the pattern, a selection of spacing between holes in the pattern, and/or a size of each hole in the pattern, among various other possibilities. Other examples are possible as well.

B. Scanning of Existing Objects

In an example implementation, a geometry of a substrate to be fabricated could be determined by the control system 310A in various ways. In one case, a geometry of the substrate could be created based on input provided via a modeling software or the like. In another case, however, the control system 310A may receive sensor data (e.g., a sensor scan by an image capture device) of a substrate and may then use that sensor data to determine a geometry for the substrate, which could then be used as basis for fabrication of the substrate into a desired 3D shape. As an example, a user may seek to drill holes into an existing shelf and could use the disclosed system to perform a sensor scan of the shelf and then have the system determine geometry of the shelf. Once the system determines the geometry, the user could then select a hole pattern template to be projected onto a desired location on the existing shelf and the projection system may then project the selected template. Other cases and examples are also possible.

C. Calibration

In an example implementation, the disclosed system may be configured to project projections that assist with variation calibration aspects. In particular, the disclosed system may be configured to enter a calibration mode (e.g., following detection of a particular gesture) during which the system calibrates position, orientation, and/or shape of the substrate, among others. During the calibration mode, the system may detect one or more gestures specifying one or more locations (e.g., locations specified using a prompt on a GUI) on the substrate, such as corners of the substrate and/or edges of the substrate for instance. Based on such gestures, the system may determine the specific locations that have been specified and may then use those locations as basis for calibration. Moreover, the system could also project projections indicative of the determined locations so as to confirm a successful calibration. For example, the projection system may project a mark onto each corner of a box (i.e., being used as a substrate) and may also project a dynamic projection of one or more rectangles or the like tracing edges of the box. Other examples are also possible.

D. Visualization Projections

In an example implementations, the disclosed system may be configured to project dynamic projection to assist with visualization of a fabrication plan and/or of performance of a design of an object to be fabricated (or being fabrication), among other possibilities.

For example, a user may seek to have a motorcycle fairing fabricated and may create a design of the fairing using techniques described herein. As part of the design, the user may adjust curvature of the fairing from one curvature to the next, and the disclosed system may projection projections to help visualize airflow characteristics resulting from each such possible curvatures (e.g., a projected visualization of airflow over the fairing.) In another example, an adhesive or the like could be used to secure tiles for a robotically tiled surface. In this example, the control system may receive temperature data from temperature sensors placed in the vicinity of such tiles, and may use the temperature data to determine respective remaining cure time for one or more tiles. Then, the control system may use such determine information as basis for determining visualization projections representative of respective cure times, and may then direct the projection system to project such visualization projections onto the tiles, among other possible locations. In yet another example, visualization projections could take the form of a dynamic cut pattern that a user could follow to manually cut a substrate in a certain location. For instance, the cut pattern could be a simple line or mating halves of a joint, among other options. Other examples are also possible.

VI. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method comprising:
receiving, by a control system, model data defining a three-dimensional (3D) shape of a physical object that is fabricable out of a substrate at a work site;
directing, by the control system, a projection system to emit onto the substrate a projection illustrative of the 3D shape defined by the model data;
transmitting, by the control system to a robotic system that includes a cutting tool, fabrication instructions that direct the robotic system to fabricate the physical object by carving the substrate, using the cutting tool, along the projection that is illustrative of the 3D shape defined by the model data, and that is emitted onto the substrate;
subsequently, during fabrication of the physical object by carving the substrate, the control system:
receiving progress data indicative of a portion of the substrate that has been removed by the cutting tool of the robotic system; and
directing the projection system to update the projection of the 3D shape to remove a portion of the projection corresponding to the portion of the substrate that has been removed by the cutting tool of the robotic system.

2. The method of claim 1, wherein directing the projection system to emit the projection onto the substrate occurs during fabrication of the physical object out of the substrate.

3. The method of claim 1,
wherein directing the projection system to emit the projection onto the substrate comprises directing the projection system to emit the projection onto a particular location on the substrate; and
wherein the fabrication instructions direct the robotic system to fabricate the physical object by carving the substrate at fabrication points on the substrate that substantially correspond to the particular location on the substrate onto which the projection is emitted.

4. The method of claim 1,
wherein the fabrication instructions specify fabrication points on the substrate at which the robotic system is to fabricate the physical object by carving the substrate; and
wherein directing the projection system to emit onto the substrate the updated projection comprises directing the projection system to emit the updated projection onto a particular location on the substrate that corresponds to fabrication points at which the robotic system is set to fabricate a remaining portion of the physical object that has yet to be fabricated.

5. The method of claim 1, wherein the fabricated portion is a first fabricated portion, and wherein the portion removed from the projection is a first removed portion, the method further comprising:
further during fabrication of the physical object out of the substrate, the control system: receiving further progress data indicative of a second portion of the substrate that has been removed by the cutting tool of the robotic system; and
directing the projection system to further update the projection of the 3D shape to remove a second portion of the projection corresponding to the second portion of the substrate that has been removed by the cutting tool of the robotic system.

6. The method of claim 1, further comprising:
receiving, by the control system, input data indicative of an adjustment to the 3D shape of a remaining portion of the physical object that has yet to be fabricated; and
in response to receiving the input data, the control system adjusting the model data to define the adjusted 3D shape in accordance with the input data.

7. The method of claim 6, wherein the control system receives the input data during fabrication of the physical object by carving the substrate.

8. The method of claim 6, further comprising:
further in response to receiving the input data, the control system directing the projection system to further update the projection to illustrate the adjusted 3D shape of the remaining portion of the physical object as defined by the adjusted model data.

9. The method of claim 8, wherein directing the projection system to further update the projection occurs during fabrication of the physical object by carving the substrate.

10. The method of claim 8, further comprising:
further in response to receiving the input data, transmitting, by the control system to the robotic system, adjusted fabrication instructions that direct the robotic system to fabricate the remaining portion of the physical object by carving the substrate in accordance with the adjusted model data defining the adjusted 3D shape.

11. The method of claim 10,
wherein directing the projection system to further update the projection comprises directing the projection system to emit the further updated projection onto a particular location on the substrate; and
wherein the adjusted fabrication instructions direct the robotic system to fabricate the remaining portion of the physical object by carving the substrate at fabrication points on the substrate that substantially correspond to the particular location on the substrate onto which the further updated projection is emitted.

12. The method of claim 11, wherein the particular location is based at least on the received input data.

13. The method of claim 6, wherein receiving the input data comprises:
detecting, by the control system, within the work site a particular movement of a particular physical item corresponding to an item that is moveable to provide instructions to the control system; and
based on the detected particular movement, determining, by the control system, the adjustment to the 3D shape of the remaining portion of the physical object.

14. The method of claim 13, further comprising:
directing, by the control system, the projection system to emit onto the substrate a series of further projections that collectively illustrate the adjustment of the 3D shape of the remaining portion into the adjusted 3D shape of the remaining portion, wherein directing the projection system to emit onto the substrate the series of further projections occurs substantially during the particular movement of the particular physical item.

15. A control system comprising:
one or more processors;
a non-transitory computer readable medium; and
program instructions stored on the non-transitory computer readable medium and executable by the one or more processors to:
receive model data defining a three-dimensional (3D) shape of a physical object that is fabricable out of a substrate at a work site;
direct a projection system to emit onto the substrate a projection illustrative of the 3D shape defined by the model data;
transmit, to a robotic system that includes a cutting tool, fabrication instructions that direct the robotic system to fabricate the physical object by carving the substrate, using the cutting tool, along the projection that is illustrative of the 3D shape defined by the model data, and that is emitted onto the substrate;
subsequently, during fabrication of the physical object by carving the substrate, the control system:
receive progress data indicative of a portion of the substrate that has been removed by the cutting tool of the robotic system; and
direct the projection system to update the projection of the 3D shape to remove a portion of the projection corresponding to the portion of the substrate that has been removed by the cutting tool of the robotic system.

16. The control system of claim 15, wherein the program instructions being executable to direct the projection system to emit the projection onto the substrate comprises the program instructions being executable to direct the projection system to emit the projection onto the substrate during fabrication of the physical object by carving the substrate.

17. The control system of claim 15, wherein the fabricated portion is a first fabricated portion, wherein the portion removed from the projection is a first removed portion, and wherein the program instructions are further executable, during fabrication of the physical object out of the substrate, to:
receive further progress data indicative of a second portion of the substrate that has been removed by the cutting tool of the robotic system; and
direct the projection system to further update the projection of the 3D shape to remove a second portion of the projection corresponding to the second portion of the substrate that has been removed by the cutting tool of the robotic system has been fabricated.

18. The control system of claim 15, wherein the program instructions are further executable to:
receive input data indicative of an adjustment to the 3D shape of a remaining portion of the physical object that has yet to be fabricated; and
in response to receiving the input data, adjust the model data to define the adjusted 3D shape in accordance with the input data.

19. A non-transitory computer readable medium having stored therein instructions executable by one or more processors to cause a control system to perform functions comprising:
receiving model data defining a three-dimensional (3D) shape of a physical object that is fabricable out of a substrate at a work site;
directing a projection system to emit onto the substrate a projection illustrative of the 3D shape defined by the model data;
transmitting, to a robotic system that includes a cutting tool, fabrication instructions that direct the robotic system to fabricate the physical object by carving the substrate, using the cutting tool, along the projection that is illustrative of the 3D shape defined by the model data, and that is emitted onto the substrate;
subsequently, during fabrication of the physical object by carving the substrate, the control system:
receiving progress data indicative of a portion of the substrate that has been removed by the cutting tool of the robotic system; and
directing the projection system to update the projection of the 3D shape to remove a portion of the projection corresponding to the portion of the substrate that has been removed by the cutting tool of the robotic system.

20. The non-transitory computer readable medium of claim 19, the functions further comprising:
receiving input data indicative of an adjustment to the 3D shape of a remaining portion of the physical object that has yet to be fabricated; and
in response to receiving the input data, adjusting the model data to define the adjusted 3D shape in accordance with the input data.

* * * * *